United States Patent
Kleber et al.

(10) Patent No.: US 11,954,705 B2
(45) Date of Patent: Apr. 9, 2024

(54) LOW ENTROPY BROWSING HISTORY FOR ADS QUASI-PERSONALIZATION

(71) Applicant: Google LLC, Mountain View, CA (US)

(72) Inventors: Michael Kleber, Newton, MA (US); Gang Wang, Jersey City, NJ (US); Daniel Ramage, Seattle, WA (US); Charlie Harrison, Mountain View, CA (US); Josh Karlin, Mountain View, CA (US); Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/892,699

(22) Filed: Aug. 22, 2022

(65) Prior Publication Data

US 2022/0391947 A1    Dec. 8, 2022
US 2023/0222542 A9    Jul. 13, 2023

Related U.S. Application Data

(63) Continuation of application No. 16/698,548, filed on Nov. 27, 2019, now Pat. No. 11,423,441, which is a (Continued)

(51) Int. Cl.
*G06F 7/02*    (2006.01)
*G06F 16/00*    (2019.01)
(Continued)

(52) U.S. Cl.
CPC ....... *G06Q 30/0255* (2013.01); *G06F 16/951* (2019.01); *H04L 9/085* (2013.01); *H04L 9/32* (2013.01); *H04L 2209/42* (2013.01)

(58) Field of Classification Search
CPC ... G06Q 30/0255; G06F 16/951; H04L 9/085; H04L 9/32; H04L 2209/42
See application file for complete search history.

(56) References Cited

U.S. PATENT DOCUMENTS

| 2009/0006974 A1 | 1/2009 | Harinarayan et al. |
| 2009/0089273 A1 | 4/2009 | Hicks |

(Continued)

FOREIGN PATENT DOCUMENTS

| CN | 103647800 | 3/2014 |
| CN | 105991722 | 10/2016 |

(Continued)

OTHER PUBLICATIONS

Bredereck, Robert et al, "Pattern-Guided Data Anonymization and Clustering," Mathematical Foundations of Computer Science 2011, pp. 182-193. (Year: 2011).*

(Continued)

*Primary Examiner* — Bruce M Moser
(74) *Attorney, Agent, or Firm* — Fish & Richardson P.C.

(57) ABSTRACT

The present disclosure provides systems and methods for content quasi-personalization or anonymized content retrieval via aggregated browsing history of a large plurality of devices, such as millions or billions of devices. A sparse matrix may be constructed from the aggregated browsing history, and dimensionally reduced, reducing entropy and providing anonymity for individual devices. Relevant content may be selected via quasi-personalized clusters representing similar browsing histories, without exposing individual device details to content providers.

20 Claims, 10 Drawing Sheets

Related U.S. Application Data continuation-in-part of application No. 16/535,912, filed on Aug. 8, 2019, now Pat. No. 11,194,866.

(60) Provisional application No. 62/887,902, filed on Aug. 16, 2019.

(51) Int. Cl.
*G06F 16/951* (2019.01)
*G06Q 30/0251* (2023.01)
*H04L 9/08* (2006.01)
*H04L 9/32* (2006.01)

(56) References Cited

U.S. PATENT DOCUMENTS

| | | |
|---|---|---|
| 2011/0270857 A1 | 11/2011 | Bommireddipalli et al. |
| 2012/0203723 A1 | 8/2012 | Huang et al. |
| 2012/0317638 A1 | 12/2012 | Carrara et al. |
| 2016/0162924 A1 | 6/2016 | Rathod |
| 2017/0046510 A1 | 2/2017 | Chen et al. |
| 2017/0091303 A1 | 3/2017 | Rashid et al. |
| 2017/0262894 A1 | 9/2017 | Kirti et al. |
| 2017/0323334 A1 | 11/2017 | Sheppard et al. |
| 2018/0188932 A1 | 7/2018 | So et al. |
| 2019/0034535 A1 | 1/2019 | Ezepov et al. |
| 2019/0122111 A1* | 4/2019 | Min .................. G06N 3/045 |

FOREIGN PATENT DOCUMENTS

| | | |
|---|---|---|
| EP | 2533168 | 12/2012 |
| EP | 3868076 | 8/2021 |
| EP | 3868077 | 8/2021 |
| GB | 2593363 | 9/2021 |
| GB | 2594367 | 10/2021 |
| JP | 2010-106033 | 5/2010 |
| JP | 2011-003155 | 1/2011 |
| JP | 2013-073524 | 4/2013 |
| JP | 105608117 | 5/2016 |
| KR | 10-2014-0038463 | 3/2014 |
| WO | WO 2015131803 | 9/2015 |

OTHER PUBLICATIONS

Aggarwal, Gagan et al., "Achieving Anonymity via Clustering," PODS (Proceedings of ACM symposium on Principles of Database Systems) 2006. (Year: 2006).*
Notice of Allowance in Korean Appln. No. 10-2021-7014910, dated Jul. 17, 2023, 3 pages (with English translation).
Office Action in Chinese Appln. No. 202080006197.3, dated Mar. 16, 2023, 24 pages (with English translation).
Office Action in European Appln. No. 20722410.6, dated Mar. 27, 2023, 13 pages.
Notice of Allowance in Japanese Appln. No. 2021-527201, dated Feb. 27, 2023, 5 pages (with English translation).
Notice of Allowance in Japanese Appln. No. 2021-527202, dated Feb. 27, 2023, 5 pages (with English translation).
Notice of Allowance in Korean Appln. No. 10-2021-7014523, dated Jan. 17, 2023, 4 pages (with English translation).
Ashadullah et al., "Web Links Prediction and Category-Wise Recommendation Based on Browser History," Feb. 21, 2019, reteived from https://deepai.org/publication/web-links-prediction-and-category-wise-recommendation-based-on-browser-history.
Balsa et al., "OB-PWS: Obfuscation-Based Private Web Search," IEEE Symposium on Security and Privacy, IEEE, May 2012, pp. 491-505.
Beigi et al., "Protecting user privacy: An approach for untraceable web browsing history and unambiguous user profiles," The Twelfth ACM International Conference on Web Search and Data Mining, Feb. 11-15, 2019; Jan. 2019, 9 pages.
Grcar et al., "User Profiling for Interest-focused Browsing History," May 29, 2015, pp. 99-108, retrieved on May 26, 2020, retrieved from URL <http://ceur-ws.org/Vol-137/09_grcar_final.pdf>, 11 pages.
International Preliminary Report on Patentability in International Appln. No. PCT/US2020/026020, dated Feb. 17, 2022, 12 pages.
International Search Report and Written Opinion in International Appln. No. PCT/US2020/026017, dated Jun. 8, 2020, 22 pages.
International Search Report and Written Opinion in International Appln. No. PCT/US2020/026020, dated Jun. 23, 2020, 19 pages.
Javheri et al., "A Survey on Privacy Preserving Machine Learning Techniques for Distributed Data Mining," International Journal of Computer Sciences and Engineering, Jun. 2018, 6(6):1130-1139.
Min-Yen Kan and Hoang Oanh Nguyen Thi, Fast webpage classification using URL features. In Proc. of Conf. on Info and Knowledge Management (CIKM '05). Bremen, Germany, Nov. 2005. Poster Paper. pp. 325-336.
Notice of Allowance in Chinese Appln. No. 202080006300.4, dated Oct. 10, 2022, 7 pages (with English translation).
Office Action in Indian Appln. No. 202127020245, dated Mar. 13, 2022, 9 pages (with English translation).
Office Action in Japanese Appln. No. 2021-527202, dated Oct. 24, 2022, 4 pages (with English translation).
Office Action in Korean Appln. No. 10-2021-7014523, dated Jul. 1, 2022, 6 pages (with English translation).
Toch et al., "Personalization and privacy: a survey of privacy risks and remedies in personalization based systems," User Modeling and User-Adapted Interaction, Mar. 2012, 22:203-220.
Notice of Allowance in European Appln. No. 20722409.8, dated May 9, 2023, 9 pages.
Office Action in Great Britain Appln. No. 2107197.2, dated Jun. 26, 2023, 4 pages.
Office Action in Great Britain Appln. No. 2107198.0, dated Jun. 21, 2023, 5 pages.
Bashir et al., "Diffusion of User Tracking Data in the Online Advertising Ecosystem," Proc. Priv. Enhancing Technol., Oct. 2018, 2018(4):85-103.
Chromium.org [online], "How private browsing works in Chrome," Jul. 2021, retrieved on Aug. 2, 2021, retrieved from URL<https://support.google.com/chrome/answer/7440301?hl=en&ref_topic=7437824>, 2 pages.
Chromium.org [online], "The Chromium Projects," Jul. 2021, retrieved on Aug. 2, 2021, retrieved from URL<https://www.chromium.org/>, 1 page.
DataTracker.ietf.org [online], "Byte Sequences," 2020, retrieved on Aug. 2, 2021, retrieved from URL<https://datatracker.ietf.org/doc/html/draft-ietf-httpbis-header-structure-09#section-3.10>, 1 page.
Developers.Google.com [online], "Protos & Reference Data," Jul. 2021, retrieved on Aug. 2, 2021, retrieved from URL<https://developers.google.com/authorized-buyers/rtb/data>, 4 pages.
GitHub.com [online], "Consider a Sec-CH-prefix for client hint headers #716," Nov. 2018, retrieved on Aug. 2, 2021, retrieved from URL<https://github.com/httpwg/http-extensions/issues/7160>, 1 page.
Grier et al., "Secure Web Browsing with the OP Web Browser." Proceedings—IEEE Symposium on Security and Privacy, 2008, 402-416.
International Preliminary Report on Patentability in International Appln. No. PCT/US2020/026017, dated Feb. 17, 2022, 15 pages.
Kenthapadi et al., "Privacy via the Johnson-Lindenstrauss Transform," arXiv, Apr. 2012, 24 pages.
Office Action in Chinese Appln. No. 202080006197.3, dated Oct. 8, 2022, 26 pages (with English translation).
Office Action in Indian Appln No. 202127019685, dated Mar. 25, 2022, 9 pages (with English Translation).
Office Action in Japanese Appln. No. 2021-527201, dated Oct. 24, 2022, 7 pages (with English translation).
Ohmori et al., "Web page recommendation using browsing history with SOM Visualization" The 2nd Forum on Data Engineering and Information Management—DEIM 2010—Proceedings, Japan, IEICE Technical Committee on Data Engineering Research, D6-1, May 25, 2010, 9 pages.
Sontag et al., "Probabilistic Models for Personalizing Web Search," 2012 ACM Conference on Web Search and Data Mining (WSDM '12), Feb. 8-12, 2012, 433-442.

(56) References Cited

OTHER PUBLICATIONS

Support.google.com [online], "About Demographics and Interests," 2020, retrieved on Aug. 2, 2021, retrieved from URL <https://support.google.com/analytics/answer/2799357?hl=en#zippy=%2Cin-this-article>, 4 pages.

TheVerge.com [online], "Tumblr will ban all adult content on Dec. 17," Dec. 2018, retrieved on Aug. 2, 2021, retrieved from URL <https://www.theverge.com/2018/12/3/18123752/tumblr-adult-content-porn-ban-date-explicit-changes-why-safe-mode>, 3 pages.

Wikipedia.org [online], "Binary classification," Oct. 2017, retrieved on Aug. 2, 2021, retrieved from URL <https://en.wikipedia.org/wiki/Binary_classification>, 4 pages.

Wikipedia.org [online], "Cluster analysis," Oct. 2020, retrieved on Aug. 2, 2021, retrieved from URL <https://en.wikipedia.org/wiki/Cluster_analysis>, 21 pages.

Wikipedia.org [online], "Dimensionality reduction," Jan. 2019, retrieved on Aug. 2, 2021, retrieved from URL <https://en.wikipedia.org/wiki/Dimensionality_reduction>, 2 pages.

Wikipedia.org [online], "Half-precision floating-point format," Feb. 2019, retrieved on Aug. 2, 2021, retrieved from URL <https://en.wikipedia.org/wiki/Half-precision_floating-point_format>, 6 pages.

Wikipedia.org [online], "Http-only cookie," Mar. 2021, retrieved on Aug. 2, 2021, retrieved from URL <https://en.wikipedia.org/wiki/HTTP_cookie#Http-only_cookie>, 1 page.

Wikipedia.org [online], "Secure cookie," Mar. 2021, retrieved on Aug. 2, 2021, retrieved from URL <https://en.wikipedia.org/wiki/HTTP_cookie#Secure_cookie>, 1 page.

Wikipedia.org [online], "SimHash," Jan. 2017, retrieved on Aug. 2, 2021, retrieved from URL <https://en.wikipedia.org/wiki/SimHash>, 2 pages.

Wikipedia.org [online], "t-closeness," May 2014, retrieved on Aug. 2, 2021, retrieved from URL <https://en.wikipedia.org/wiki/T-closeness>, 2 pages.

Extended European Search Report in European Appln. No. 23198403.0, mailed on Oct. 26, 2023, 12 pages.

Park et al., "Secure cookies on the Web." IEEE internet computing 4.4, Jul. 2000, 36-44.

Extended European Search Report in European Appln. No. 23198404.8, mailed on Nov. 7, 2023, 6 pages.

Office Action in Indian Appln. No. 202328006263, mailed on Nov. 24, 2023, 8 pages (with English translation).

\* cited by examiner

LOW ENTROPY BROWSING HISTORY FOR ADS QUASI-PERSONALIZATION

CROSS-REFERENCES TO RELATED APPLICATIONS

The present application is a continuation of U.S. patent application Ser. No. 16/698,548, filed Nov. 27, 2019, titled "Low Entropy Browsing History for Ads Quasi-Personalization", which claims priority under 35 U.S.C. § 120 as a continuation-in-part of U.S. patent application Ser. No. 16/535,912, titled "Low Entropy Browsing History for Content Quasi-Personalization," filed Aug. 8, 2019 and claims priority under 35 U.S.C. § 119(e) to U.S. Patent Application No. 62/887,902, titled "Low Entropy Browsing History for Content Quasi-Personalization," filed Aug. 16, 2019, all of which are incorporated herein by reference in their entirety.

BACKGROUND

In computer networked environments such as the Internet, content providers can provide content items to be inserted into an information resource (e.g., a webpage) processed and rendered by an application (e.g., a web browser) executing on a client device.

Personalized content delivery is typically based on capturing identifying information of a user and/or device, such as a browsing or access history of the device. However, this may result in the collection of individually trackable data, exposing users to potential security risk and consuming of excessive computing resources.

SUMMARY

The systems and methods discussed herein provide for content quasi-personalization or anonymized content retrieval via aggregated browsing history of a large plurality of devices, such as millions or billions of devices. A sparse matrix may be constructed from the aggregated browsing history, and dimensionally reduced, reducing entropy and providing anonymity for individual devices. Relevant content may be selected via quasi-personalized clusters representing similar browsing histories, without exposing individual device details to content providers.

In one aspect, the present disclosure is directed to a method for anonymized content retrieval. The method includes generating, by a browser application of a computing device, a profile based on browsing history of the computing device. The method also includes encoding, by the browser application, the profile as an n-dimensional vector. The method also includes calculating, by the browser application, a reduced dimension vector from the n-dimensional vector. The method also includes determining, by the browser application, a first cluster corresponding to the reduced dimension vector. The method also includes transmitting, by the browser application to a content server, a request for an item of content, the request comprising an identification of the first cluster. The method also includes receiving, by the browser application from the content server, an item of content selected according to the identification of the first cluster.

In some implementations, the method includes generating the profile based on the browsing history of the user of the computing device by identifying, from a log of the browsing history, a number of accesses to each of a plurality of addresses n within a predetermined time period. In some implementations, the method includes generating a string with values representing each of one or more accesses to an address associated with a corresponding position in the string within a predetermined time period.

In some implementations, the method includes performing a singular value decomposition of the n-dimensional vector. In a further implementation, the method includes receiving, from a second computing device, a set of singular vectors of the singular value decomposition. In a still further implementation, the method includes transmitting, to the second computing device, the n-dimensional vector, the second computing device calculating the sets of singular vectors based on an aggregation of the n-dimensional vector of the computing device and an n-dimensional vector of at least one other computing device.

In some implementations, the method includes receiving, from a second computing device, boundaries of each of a plurality of clusters. In a further implementation, the method includes selecting the first cluster of the plurality of clusters, responsive to the reduced dimension vector being within the boundaries of the first cluster.

In some implementations, the method includes receiving, by the browser application from a second computing device, weights of a neural net model determined based on an aggregation of the n-dimensional vector of the computing device and an n-dimensional vector of at least one other computing device; applying, by a machine learning system of the browser application, the neural net model to the reduced dimension vector to generate an ranking of a predetermined set of clusters; and selecting, by the browser application, the first cluster as a highest ranked cluster of the predetermined set of clusters.

In another aspect, the present disclosure is directed to a method for anonymized content retrieval. The method includes receiving, by a server computing device from each of a plurality of client computing devices, a profile based on a browsing history of the corresponding client computing device, each profile comprising an n-dimensional vector. The method also includes aggregating, by the server computing device, the plurality of n-dimensional vectors of the plurality of profiles into a matrix. The method also includes calculating, by the server computing device, a singular value decomposition of the matrix to generate a set of singular values. The method also includes transmitting, by the server computing device to each of the plurality of client computing devices and at least one content provider device, the set of singular values.

In some implementations, the method includes determining, by the server computing device, boundaries of each cluster of a set of clusters of the matrix. In a further implementation, the method includes transmitting, by the server computing device to each of the plurality of client computing devices and the at least one content provider device, the boundaries of each cluster of the set of clusters of the matrix.

In some implementations, the method includes identifying, by the server computing device, each cluster of a set of clusters via a neural net model from the matrix. In a further implementation, the method includes transmitting weights of the neural net model to each of the plurality of client computing devices and the at least one content provider device.

In still another aspect, the present disclosure is directed to a system for anonymized content retrieval. The system includes a computing device comprising a network interface in communication with a content server, a memory storing a browsing history of the computing device, and a browser application. The browser application is configured to: generate a profile based on the browsing history of the computing device; encode the profile as an n-dimensional vector; calculate a reduced dimension vector from the n-dimensional vector; determine a first cluster corresponding to the reduced dimension vector; transmit, via the network interface to the content server, a request for an item of content, the request comprising an identification of the first cluster; and receive, via the network interface from the content server, an item of content selected according to the identification of the first cluster.

In some implementations, the browser application is further configured to generate a string with values representing each of one or more accesses to an address associated with a corresponding position in the string within a predetermined time period. In some implementations, the browser application is further configured to perform a singular value decomposition of the n-dimensional vector. In a further implementation, the browser application is further configured to receive, via the network interface from a second computing device, a set of singular vectors of the singular value decomposition. In a still further implementation, the browser application is further configured to transmit, via the network interface to the second computing device, the n-dimensional vector, the second computing device calculating the sets of singular vectors based on an aggregation of the n-dimensional vector of the computing device and an n-dimensional vector of at least one other computing device.

In some implementations, the browser application is further configured to: receive, via the network interface from a second computing device, weights of a neural net model determined based on an aggregation of the n-dimensional vector of the computing device and an n-dimensional vector of at least one other computing device; apply the neural net model to the reduced dimension vector to generate an ranking of a predetermined set of clusters; and select the first cluster as a highest ranked cluster of the predetermined set of clusters.

At least one aspect is directed to a method of encoding identifiers for selection of content. A first application executing on a client device can identify a browsing history maintained on the client device. The browsing history can record information resources accessed by the client device via the first application. The first application can apply a classification model to the browsing history of the first application to identify a class in which to categorize the first application. The first application can assign the first application to a class identifier corresponding to the identified class. The class identifier for the first application can be identical as the class identifier for a second application. The first application can receive, from a content publisher device, an information resource comprising primary content and a content slot available to receive content from a content selection service. The first application can generate, for the content slot of the information resource, a request for content including the class identifier for the first application. The first application can transmit the request for content to the content selection service. The content selection service can use the class identifier for the first application and for the second application to select a content item to insert into the content slot of the information resource.

In some implementations, the first application can receive, from an application administrator service, a set of parameters to update the classification model for categorizing applications into one of a plurality of classes. In some implementations, the first application can modify the classification model maintained on the client device based on the set of parameters received from the application administrator service. In some implementations, the first application can train the classification model maintained on the client device using a distributed learning protocol in concert with a plurality of applications executing on a corresponding plurality of client device.

In some implementations, the first application can generate, using a dimension reduction process, a set of reduced feature vectors from the browsing history identified from the client device, the feature vector less in file size than the browsing history. In some implementations, applying the classification model can include applying the classification model to the set of reduced feature vectors generated from the browsing history.

In some implementations, the first application can determine, in accordance to an identifier assignment policy, that the classification model is to be applied to the browsing history. In some implementations, applying the classification model can include applying the classification model responsive to determining that the classification model is to be applied in accordance to the identifier assignment policy.

In some implementations, applying the classification model can include applying the classification model to identify the class from a plurality of classes. Each class of the plurality of classes can have at least a predetermined number of clients to be categorized to the class. In some implementations, assigning the first application to the class identifier further can include assigning the first application to the class identifier of a plurality of class identifiers. Each class identifier can correspond to one of the plurality of classes.

In some implementations, generating the request for content can include generating the request for content without a unique tracking identifier corresponding to an account associated with the first application, the first application, or the client device provided by the content selection service. In some implementations, generating the request for content can include generating, for transmission over a connection with the content selection service, the request for content comprising a secure cookie. The secure cookie can have the class identifier for the first application. In some implementations, identifying the browsing history can include identifying the browsing history over a predefined time range with which to apply the classification model.

At least one aspect is directed to a system for encoding identifiers for selection of content. The system can include a first application executable on a client device having one or more processors. The first application executing on a client device can identify a browsing history maintained on the client device. The browsing history can record information resources accessed by the client device via the first application. The first application can apply a classification model to the browsing history of the first application to identify a class in which to categorize the first application. The first application can assign the first application to a class identifier corresponding to the identified class. The class identifier for the first application can be identical as the class identifier for a second application. The first application can receive, from a content publisher device, an information resource comprising primary content and a content slot available to receive content from a content selection service. The first application can generate, for the content slot of the information resource, a request for content including the class identifier for the first application. The first application can transmit the request for content to the content selection service. The content selection service can use the class identifier for the first application and for the second application to select a content item to insert into the content slot of the information resource.

In some implementations, the first application can receive, from an application administrator service, a set of parameters to update the classification model for categorizing applications into one of a plurality of classes. In some implementations, the first application can modify the classification model maintained on the client device based on the set of parameters received from the application administrator service. In some implementations, the first application can train the classification model maintained on the client device using a distributed learning protocol in concert with a plurality of applications executing on a corresponding plurality of client device.

In some implementations, the first application can generate, using a dimension reduction process, a set of reduced feature vectors from the browsing history identified from the client device, the feature vector less in file size than the browsing history. In some implementations, the first application can apply the classification model to the set of reduced feature vectors generated from the browsing history.

In some implementations, the first application can determine, in accordance to an identifier assignment policy, that the classification model is to be applied to the browsing history. In some implementations, the first application can apply the classification model responsive to determining that the classification model is to be applied in accordance to the identifier assignment policy.

In some implementations, the first application can apply the classification model to identify the class from a plurality of classes. Each class of the plurality of classes can have at least a predetermined number of clients to be categorized to the class. In some implementations, the first application can assign the first application to the class identifier of a plurality of class identifiers. Each class identifier can correspond to one of the plurality of classes.

In some implementations, the first application generate the request for content without a unique tracking identifier corresponding to an account associated with the first application, the first application, or the client device provided by the content selection service. In some implementations, the first application generate, for transmission over a connection with the content selection service, the request for content comprising a secure cookie. The secure cookie can have the class identifier for the first application. In some implementations, the first application can identify the browsing history over a predefined time range with which to apply the classification model.

The present disclosure also provides a computer program comprising instructions that, when executed by a computing device, cause the computing device to perform any of the methods disclosed herein. The present disclosure also provides a computer-readable medium comprising instructions that, when executed by a computing device, cause the computing device to perform any of the methods disclosed herein.

At least one aspect is directed to a method of encoding identifiers for selection of content. The method can include identifying a plurality of information resources accessed via a first application executing on the client device. The method can include extracting, from each information resource of the plurality of information resources, a feature corresponding to at least a portion of content of the information resource. The method can include applying a classification model to the features extracted from the plurality of information resources to identify a set of classes to which to categorize the first application. The method can include determining that a class from the set of classes satisfies a threshold number of applications assigned to the class. The method can include assigning, responsive to determining that the class satisfies the threshold number, the first application to a class identifier corresponding to the class. The class identifier for the first application can be identical as the class identifier for a second application. The method can include receiving, from a content publisher device for presentation via the first application, an information resource comprising primary content and a content slot available to receive content from a content selection service. The method can include generating, for the content slot of the information resource, a request for content including the class identifier for the first application. The method can include transmitting the request for content to the content selection service. The content selection service can use the class identifier for the first application and for the second application to select a content item to insert into the content slot of the information resource.

In some implementations, the method can include selecting, responsive to receiving of the information resource, the class from the set of classes in accordance with an obfuscation policy. The obfuscation policy can specify a condition under which corresponding class identifiers are permitted to be included in requests for content associated with the content slot of the information resource.

In some implementations, the method can include selecting, responsive to receiving a second information resource, in accordance with an obfuscation policy, a second class identifier of the set of classes identified from applying the classification model. The second class identifier can be different from the class assigned to the first application. In some implementations, the method can include generating, for a content slot of the second information resources, a second request for content including a second class identifier corresponding to the second class instead of the class identifier corresponding to the class.

In some implementations, the method can include determining, responsive to receiving a second information resource, in accordance with an obfuscation policy, not to include any class identifiers into a second request for content to insert into a content slot of the second information resource. In some implementations, the method can include transmitting, responsive to determining to not include any class identifiers, the second request for content to the content selection service, the second request for content lacking any class identifiers.

In some implementations, determining that the class satisfies the threshold number can include performing a threshold cryptographic protocol in concert with a class authorization service using an encrypted class identifier generated using the class identifier corresponding to the class. In some implementations, determining that the class satisfies the threshold number can include checking the class identifier against a probabilistic data structure for the class identifier maintained by a class authorization service In some implementations, transmitting the request for content can include transmitting the request for content. The content selection service can use the class identifier to maintain an aggregate browsing history for the first application and the second application. In some implementations, applying the classification model can include applying the classification model to identify, from a plurality of classes, the set of classes within a proximity threshold of one another in a feature space defined by the classification model.

In some implementations, the method can include generating, using a dimension reduction process, a set of reduced feature vectors from the browsing history identified from the client device, the feature vector less in file size than the browsing history. In some implementations, applying the classification model can include applying the classification model to the set of reduced feature vectors generated from the browsing history. In some implementations, extracting the features further comprises extracting the feature from at least a portion of content of the information resource, the portion of content including at least one of text data, visual data, or audio data.

At least one aspect is directed to a system for encoding identifiers for selection of content. The system can include a first application executable on a client device having one or more processors. The first application can identify a plurality of information resources accessed via a first application executing on the client device. The first application can extracting, from each information resource of the plurality of information resources, a feature correspond to at least a portion of content of the information resource. The first application can apply a classification model to the features extracted from the plurality of information resources to identify a set of classes to which to categorize the first application. The first application can determine that a class from the set of classes satisfies a threshold number of applications assigned to the class. The first application can assigning, responsive to determine that the class satisfies the threshold number, the first application to a class identifier corresponding to the class. The class identifier for the first application can be identical as the class identifier for a second application. The first application can receiving, from a content publisher device for presentation via the first application, an information resource comprising primary content and a content slot available to receive content from a content selection service. The first application can generating, for the content slot of the information resource, a request for content including the class identifier for the first application. The first application can transmit the request for content to the content selection service. The content selection service can use the class identifier for the first application and for the second application to select a content item to insert into the content slot of the information resource.

In some implementations, the first application can select, responsive to receiving of the information resource, the class from the set of classes in accordance with an obfuscation policy. The obfuscation policy can specify a condition under which corresponding class identifiers are permitted to be included in requests for content associated with the content slot of the information resource.

In some implementations, the first application can select, responsive to receiving a second information resource, in accordance with an obfuscation policy, a second class identifier of the set of classes identified from applying the classification model. The second class identifier can be different from the class assigned to the first application. In some implementations, the first application can generate, for a content slot of the second information resources, a second request for content including a second class identifier corresponding to the second class instead of the class identifier corresponding to the class.

In some implementations, the first application can determine, responsive to receiving a second information resource, in accordance with an obfuscation policy, not to include any class identifiers into a second request for content to insert into a content slot of the second information resource. In some implementations, the first application can transmit, responsive to determining to not include any class identifiers, the second request for content to the content selection service, the second request for content lacking any class identifiers.

In some implementations, the first application can determine that the class satisfies the threshold number by performing a threshold cryptographic protocol in concert with a class authorization service using an encrypted class identifier generated using the class identifier corresponding to the class. In some implementations, the first application can determine that the class satisfies the threshold number by checking the class identifier against a probabilistic data structure for the class identifier maintained by a class authorization service In some implementations, the first application can transmit the request for content. The content selection service can use the class identifier to maintain an aggregate browsing history for the first application and the second application. In some implementations, the first application can apply the classification model to identify, from a plurality of classes, the set of classes within a proximity threshold of one another in a feature space defined by the classification model.

In some implementations, the first application can generate, using a dimension reduction process, a set of reduced feature vectors from the browsing history identified from the client device, the feature vector less in file size than the browsing history. In some implementations, the first application can apply the classification model to the set of reduced feature vectors generated from the browsing history. In some implementations, the first application can extract the feature from at least a portion of content of the information resource, the portion of content including at least one of text data, visual data, or audio data.

Optional features of one aspect may be combined with any other aspect.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Like reference numbers and designations in the various drawings indicate like elements.

DETAILED DESCRIPTION

Personalized content delivery is typically based on capturing identifying information of a user and/or device, such as a browsing or access history of the device. For example, a device may provide identifying information, such as a device identifier, account name, cookie, or other such information; and a content provider may store this information for use in selecting personalized content. As a result, content providers may obtain large amounts of data on individuals. This drastically impacts privacy and security for the devices and users. Opt-out and do-not-track policies allow users some measure of control over their privacy (provided content providers follow those policies). However, these policies impair the ability of content providers to provide relevant content. Furthermore, the requests generated in accordance with such policies may lack any user request at all, thereby impeding proper parsing of such requests.

Figure 1A:
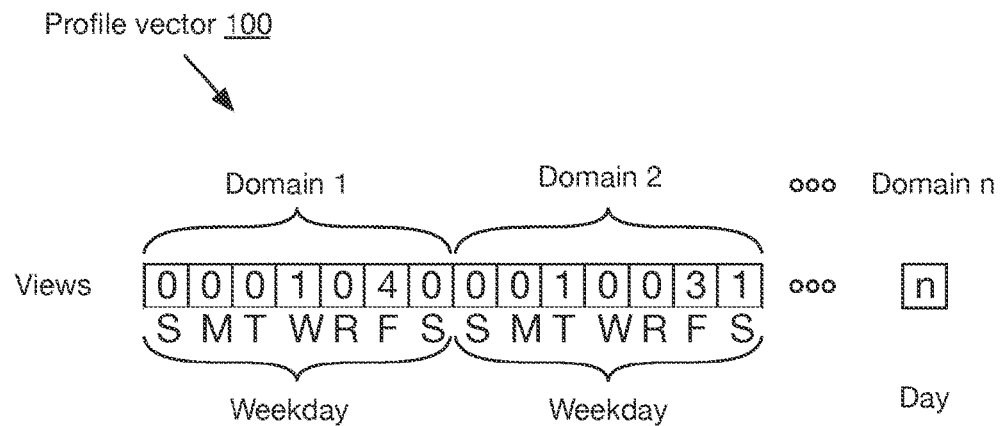
FIG. 1A is an illustration of an example profile vector, according to some implementations.

The systems and methods discussed herein provide for content quasi-personalization or anonymized content retrieval via aggregated browsing history of a large plurality of devices, such as millions or billions of devices. For example, the browsing history of each device may be encoded as a long data string, or an n-dimensional vector. FIG. 1A is an illustration of an example profile vector 100, according to some implementations. The profile vector may comprise an identification of visits or accesses by a device to a domain, website, or webpage within a given time period. In the example illustrated, the vector identifies a number of views or visits to each of a large number of domains 1-n for each day of a week. Although shown as a one-dimensional vector, in a similar implementation, the vector may comprise an n by 7 array (e.g. one row for each day). In other implementations, additional data may be included (e.g. each day of a month, time periods within a day, etc.). Thus, the vector may comprise a large n-dimensional vector or array. Additional data may be included in the vector, such as an identification of a time of generation, a location, an IP address, or any other such information.

As noted above, in many implementations, the vector may be very large. For example, there are approximately 1.8 billion active websites on the Internet and over 330 million registered domains. In some implementations, the vector may record visits or accesses to any of these domains or websites. In other implementations, the vector may record visits or access to only a subset of the domains or websites. For example, less than 1 million websites account for around 50% of web traffic. Thus, in many implementations, the vector may only record or represent accesses or visits to a subset of domains or websites. Nonetheless, even in many such implementations, the vector may be large, such as on the order of $2^{26}$ or larger.

Figure 1B:
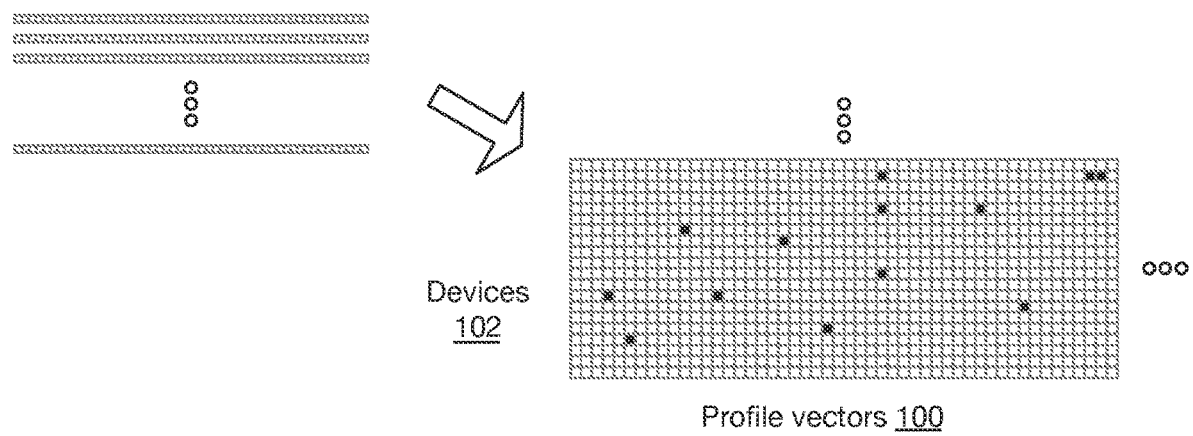
FIG. 1B is an illustration of aggregation of profile vectors into a sparse matrix, according to some implementations.

The vector may be provided to a server device, which may aggregate the vector with those of other devices, as shown in the illustration of FIG. 1B. Profile vectors 100 from each of a plurality of devices 102 may be aggregated to create a very large matrix. For example, there are billions (e.g., on the order of $2^{30}$) of monthly active users or devices on the web. A matrix combining profile vectors 100 of each of these devices may thus be $2^{30} \times 2^{26}$ dimension, or larger in some implementations.

However, this matrix is highly sparse. A typical user may visit hundreds of the millions of possible domains in a given time period, such as a week. Due to the highly sparse nature and redundancy in browsing history for any given device, it is possible to reduce the dimension of this matrix.

In some implementations, a linear dimension reduction technique such as singular vector decomposition (SVD) may be used to calculate a rank X matrix that is the best approximation to the matrix, (e.g. minimizing the square error). Each profile vector 100 may be projected to X dimensions, with X being less than the original dimensionality of the matrix. For each dimension, the projection result may be quantized to 2 to the power of Ni buckets where $i \in [1, X]$ and the number of buckets is proportional to the singular value of the corresponding dimension. $K = \Sigma Ni$ bits may be used to represent the quantiled projection result to all X dimensions. Those bits concatenated together may be the cluster identifier of the device. In other implementations, a clustering algorithm (e.g. Nearest Neighbor) may be used to cluster devices in the space with the reduced dimension.

Because singular vectors are orthogonal to each other and as a result of the quantization process, statistically similar numbers of devices (e.g. approximately equal, given the large total number of devices) may be within each cluster or identified as belonging to each cluster, assuming that there is no non-linear dependence among profile vectors. Each cluster may be represented by an identifier, sometimes referred to as a cluster identifier, browsing group identifier, or by a similar term.

In other implementations, other linear decomposition methods may be used, such as principal component analysis. In still other implementations, non-linear dimension reduction algorithms may be used to reduce dimension of the matrix. Various classification techniques may be used, including nearest neighbor searching, latent class analysis, etc.

Figure 1C:
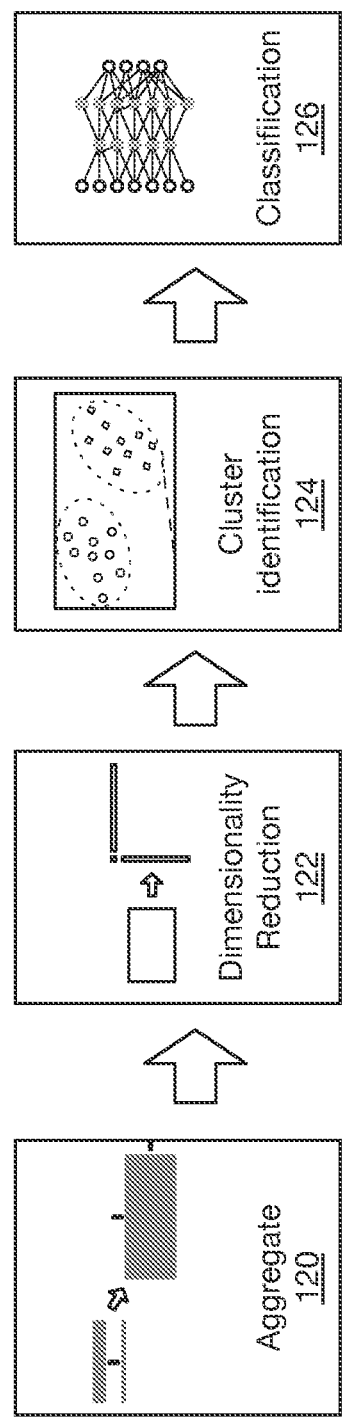
FIG. 1C is an illustration of a process for anonymization to provide pseudo-personalized clustering, according to some implementations.

FIG. 1C is an illustration of this process, according to some implementations. As shown, profile vectors from a large number of devices may be aggregated at step 120 into a large matrix. The matrix may be dimensionally reduced at step 122. Clusters may be identified at step 124 as discussed above.

In some implementations, a classification system may be trained as part of the cluster identification and/or from the cluster identification. For example, in some implementations, a neural network may be used to classify devices as part of a predetermined number of clusters. Such a network may use the dimension reduced profile vectors as inputs with cluster identifiers as outputs. The network may be trained via supervised or unsupervised learning in various implementations.

In some implementations, the neural net model or weights for the model may be provided to client devices, or other parameters for classification may be provided. The singular vectors generated from the dimension reduction may also be provided to the client devices. Accordingly, after receiving the vectors and/or the model, the clients may generate their own classification using local profile vectors, without requiring further communication to the server. The server may regenerate the singular vectors and/or the classification model parameters periodically, such as monthly or quarterly. The data transfer may be quite large in some implementations (e.g., on the order of $2^4$ singular vectors of $2^{26}$ dimensions each, in some implementations, resulting in approximately 2 GB of data required. In some implementations, to reduce data transfers to other devices, the server may compare the parameters and vectors to previously generated parameters and vectors and only provide the new set if there are significant differences (e.g. above a threshold difference), or only provide the subset of parameters and/or vectors that changed significantly. The clients may use these parameters and vectors to update their classifications locally more frequently, e.g., daily, hourly, or with every content request, in various implementations.

Similarly, the singular vectors and/or model parameters may be provided to content providers in some implementations. When a client device requests an item of content, the request may include a cluster identification. The cluster identification may be embedded in a payload or header of the request, such as within an HTTPS request or in an options field of an HTTP header. The content provider may use the neural net model or a provider-specific neural net model in some implementations to infer demographics and/or user interests for the devices within each cluster (e.g. by determining the approximate profile vector corresponding to the cluster identification based on the singular vectors of the dimension reduction, and then providing the vector to a machine learning system to infer the characteristics), without being able to identify characteristics of any individual device or user.

Accordingly, these implementations provide device anonymity through aggregation, i.e. aggregating devices with similar browsing histories or patterns together. The clustering algorithm attempts to maintain similar cluster sizes, such that every cluster contains roughly the same number of users. Given a fixed number of active devices on the Internet, the entropy of the cluster identifiers controls the cluster size (e.g. the higher the entropy of the cluster identifiers, the fewer devices in each cluster, reducing the privacy protection). By tuning the entropy of cluster identifiers (e.g. by providing fewer or greater numbers of clusters), the system may achieve a desirable level of anonymity and privacy protection while still maintaining effectiveness of content personalization.

These implementations improve on systems not utilizing aggregation and pseudo-personalization with increased privacy while maintaining effectiveness. In such unimproved systems, user or device identifiers may be used to record browsing history for a device and inferring a corresponding user's demographic information and interests based on the accumulated history. This inferred information may be used to predict effectiveness of personalized content selection, such as click-through-rates, attentiveness, or other such metrics. Instead, via the systems and methods discussed herein, browsing history may be accumulated only for groups of devices associated with a given cluster identifier or group. The inferred group demographics and interests may still be used for content selection, with inferred effectiveness metrics, while leaving the content providers unable to distinguish characteristics of devices or users within the group or cluster.

In some implementations, 2 to the power of K typical browsing history patterns are defined based on the aggregated browsing history of billions of Internet users. Each typical browsing history pattern has a unique cluster identifier or browsing history identifier, which may be represented by a K bits integer for some small K so that each cluster identifier is shared by a large number of devices. When a user selects to opt-out of personalized content selection or opts-in to pseudo-personalization, a browser application of their device may select a typical browsing history pattern that best matches the actual browsing history of the user. The browser may provide the corresponding cluster identifier to content providers for content personalization purposes.

Typical browsing history patterns and the encoding of the cluster identifiers are chosen in such a way that approximately equal numbers of devices will be associated with each cluster identifier. By controlling the value of K and the entropy of other signals that each content provider may obtain from the browser with content requests (e.g. IP addresses, user agent identifiers, etc.), the browser may significantly reduce users' re-identification risk while enabling content pseudo-personalization.

Figure 2:
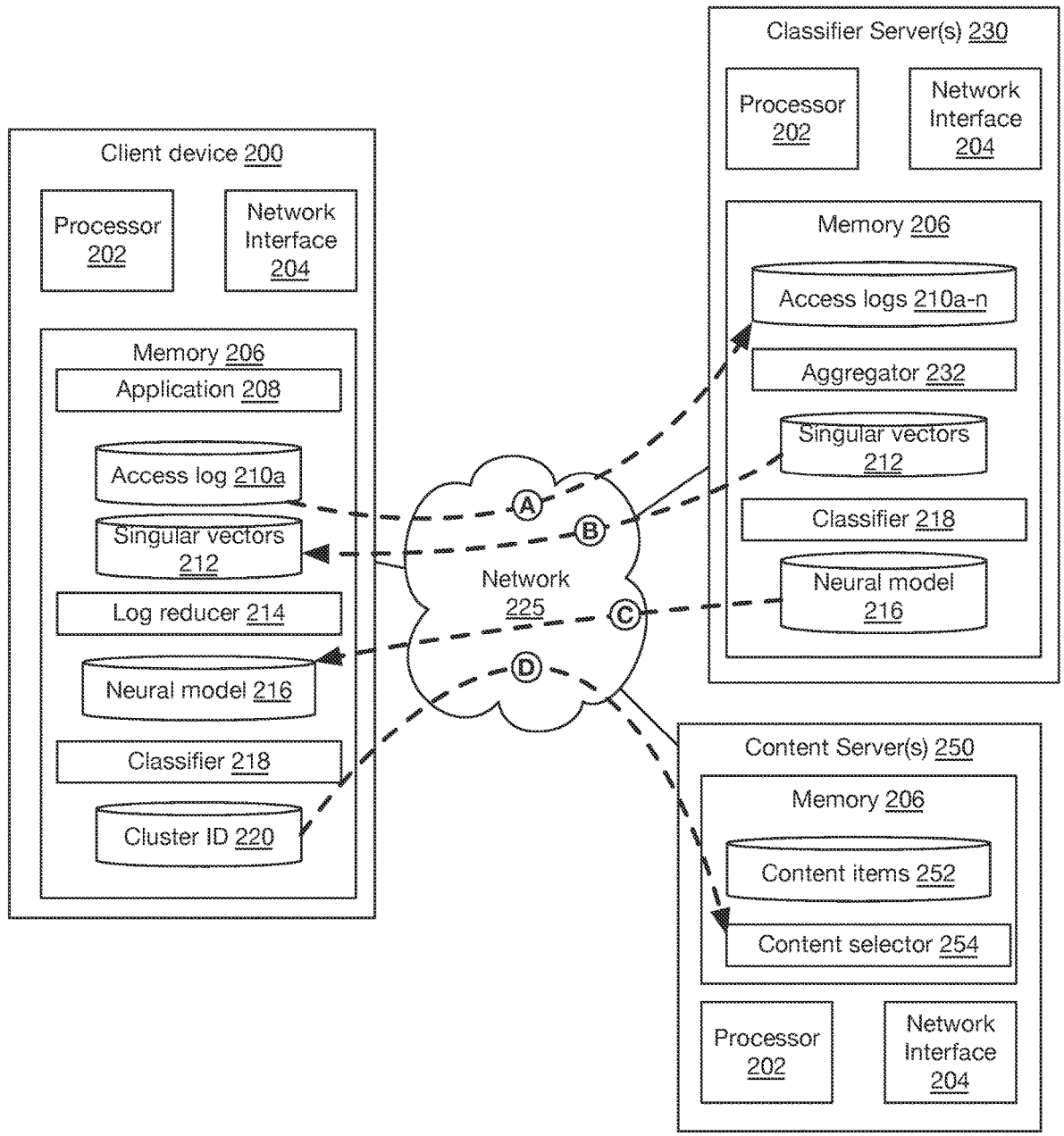
FIG. 2 is a block diagram of a system for anonymization to provide pseudo-personalized clustering, according to some implementations.

FIG. 2 is a block diagram of a system for anonymization to provide pseudo-personalized clustering, according to some implementations. A client device 200, which may comprise a desktop computer, laptop computer, tablet computer, wearable computer, smartphone, embedded computer, smart car, or any other type and form of computing device, may communicate via a network 225 with one or more servers, such as classifier servers 230 and/or content servers 250.

In many implementations, a client device 200 may include a processor 202 and a memory device 206. The memory device 206 may store machine instructions that, when executed by the processor cause the processor to perform one or more of the operations described herein. The processor 202 may include a microprocessor, ASIC, FPGA, etc., or combinations thereof. In many implementations, a processor may be a multi-core processor or an array of processors. A memory device 206 may include, but is not limited to, electronic, optical, magnetic, or any other storage devices capable of providing a processor with program instructions. A memory device may include a floppy disk, CD-ROM, DVD, magnetic disk, memory chip, ROM, RAM, EEPROM, EPROM, flash memory, optical media, or any other suitable memory from which a processor can read instructions. The instructions may include code from any suitable computer programming language such as, but not limited to, C, C++, C#, Java, JavaScript, Perl, HTML, XML, Python and Visual Basic.

A client device 200 may include one or more network interfaces 204. A network interface 204 may include any type and form of interface, including Ethernet including 10 Base T, 100 Base T, or 1000 Base T ("Gigabit"); any of the varieties of 802.11 wireless, such as 802.11a, 802.11b, 802.11g, 802.11n, or 802.11ac; cellular, including CDMA, LTE, 3G, or 4G cellular; Bluetooth or other short range wireless connections; or any combination of these or other interfaces for communicating with a network. In many implementations, a client device 200 may include a plurality of network interfaces 204 of different types, allowing for connections to a variety of networks 225. Correspondingly, network 225 may comprise a local area network (LAN), wide area network (WAN) such as the Internet, cellular network, broadband network, Bluetooth network, 802.11 (WiFi) network, satellite network, or any combination of these or other networks, and may include one or more additional devices (e.g. routers, switches, firewalls, hubs, network accelerators, caches, etc.).

A client device may include one or more user interface devices. A user interface device may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interface devices may be internal to the housing of a client device, such as a built-in display, touch screen, microphone, etc., or external to the housing of a client device, such as a monitor connected to a client device, a speaker connected to a client device, etc., according to various implementations.

Memory 206 may comprise an application 208 for execution by processor 202. Application 208 may comprise any type and form of application, such as a media application, web browser, productivity application, or any other such application, and may be generally referred to herein as a browser application. Application 208 may receive content from a content server, and may display it via a user interface for a user of the client device.

Memory 206 may store an access log 210 (shown as log 210a for the client device 200), which may be part of application 208 or maintained by application 208 (e.g. as part of a profile, preference file, history file, or other such file). The access log 210 may be stored in any format useable by application 208. The access log may comprise an identification of websites, domains, web pages, content, or other data accessed, retrieved, displayed, or otherwise obtained by application 208. Access log 210 may also store a profile vector 100 as discussed above, which may be generated from an access history of the application and/or device. The profile vector 100 may comprise an n-dimensional string or array of values representing accesses to one or more domains, web pages, websites, or other such data during a predetermined time period (e.g. day, week, time of day, etc.). As discussed above, the profile vector may be provided to a classifier server 230 (step A). The profile vector 100 may be generated by application 208 or a log reducer 214, which may comprise an application, service, daemon, routine, plug-in, or other executable logic for generating a profile vector from an access log. Log reducer 214 may comprise part of an application 208 in many implementations.

Memory 206 may also store singular vectors 212. As discussed above, singular vectors 212 may be obtained from a classifier server 230 (step B), which may be calculated from a dimensional reduction of a matrix of profile vectors of a plurality of client devices 200 as discussed above. Singular vectors 212 may be stored in any appropriate format, such as a flat file, data array, or other structure, and may be compressed in many implementations.

Memory 206 may also store parameters of a neural net model 216. As discussed above, a neural net model 216 may be generated by a classifier server and parameters or weights provided to a client device 200 (step C). A classifier 218 of client device 200, which may comprise an application, service, server, daemon, routine, or other executable logic for executing a machine learning algorithm, may utilize neural net model 216 parameters for generating a cluster identifier 220 from a dimension-reduced profile vector of client device. In some implementations, classifier 218 may comprise a hardware circuit, such as a tensor processing unit, or other such hardware. In other implementations, classifier 218 may comprise software executed by a processor 202 of the device.

Memory 206 may also store cluster identifiers 220. Cluster identifiers 220 may comprise cookies or other strings associated with a cluster identifier, and/or may encode or comprise information identifying characteristics of the cluster (e.g. XML code or parameters, parameter-value pairs, etc.). Cluster identifiers 220 may be predetermined or generated by a server 230 and provided to a client device 200. The classifier 218 of the client device may process the dimension reduced profile vector of the client device using the neural net model to generate a rank or score for each cluster identifier 220, and may select a highest ranked or scored identifier for transmission to content servers (step D) during content requests.

Classifier server(s) 230 may comprise one or more server computing devices, and may comprise one or more physical computing devices, or one or more virtual computing devices executed by one or more physical computing devices (e.g. a cloud, cluster, or server farm). Classifier server(s) 230 may be referred to generally as servers, measurement servers, aggregation servers, or by other such terms.

Classifier server(s) 230 may comprise one or more processors 202, network interfaces 204, and memory devices 206, as well as other devices not illustrated. Classifier server(s) 230 may store in memory access logs and/or profile vectors 210a-210n obtained from a plurality of client devices 200. As discussed above, an aggregator 232 of classifier server 230, which may comprise an application, server, service, routine, or other executable logic executed by processors 202, may aggregate profile vectors 210a-210n into a matrix or n-dimensional array. Aggregator 232 may also calculate a decomposition or dimension reduction of the matrix into singular vectors 212, which may be provided to client devices 200 (and content servers 250, in some implementations).

Classifier server(s) 230 may also store in memory a classifier 218. Classifier 218 may be part of aggregator 232, or may be a separate application, service, server, routine, or other executable logic executed by processors 202 and/or a hardware processor such as a tensor processing unit, for identifying clusters in the dimension-reduced matrix. In many implementations, classifier 218 may comprise a neural network or similar artificial intelligence for classifying dimension reduced vectors to one of a plurality of clusters. Parameters of the neural network, once trained, may be provided to client device(s) 200 to similarly generate cluster identifications or rankings as discussed above.

Content server(s) 250 may comprise any type and form of content providing server or service, including a content delivery network, web server, media server, social media service, or any other type and form of computing system. Content server(s) 250 may comprise one or more processors 202, network interfaces 204, and memory devices 206. In many implementations, content server(s) 250 may store a plurality of content items 252, which may comprise any type and form of content, including text, audio, video, animation, images, executable scripts, web pages, or any other such data.

Content server(s) 250 may comprise a content selector 254, which may be part of a web server or file server, or may be a separate application, service, server, daemon, routine, or other executable logic for selecting content for delivery to client devices. Content may be selected based on inferred characteristics of the device. The content server may receive a cluster identifier with a request for content from the device, and may select content based on the inferred characteristics for devices of that cluster. In some implementations, the content server may use singular vectors obtained from classifier server 230 to expand the cluster identifier to a corresponding profile vector representing the aggregate cluster. The profile vector of the cluster may not match the profile vector of any specific device, but may be an approximation or average of vectors of all devices associated with the cluster.

Figure 3:
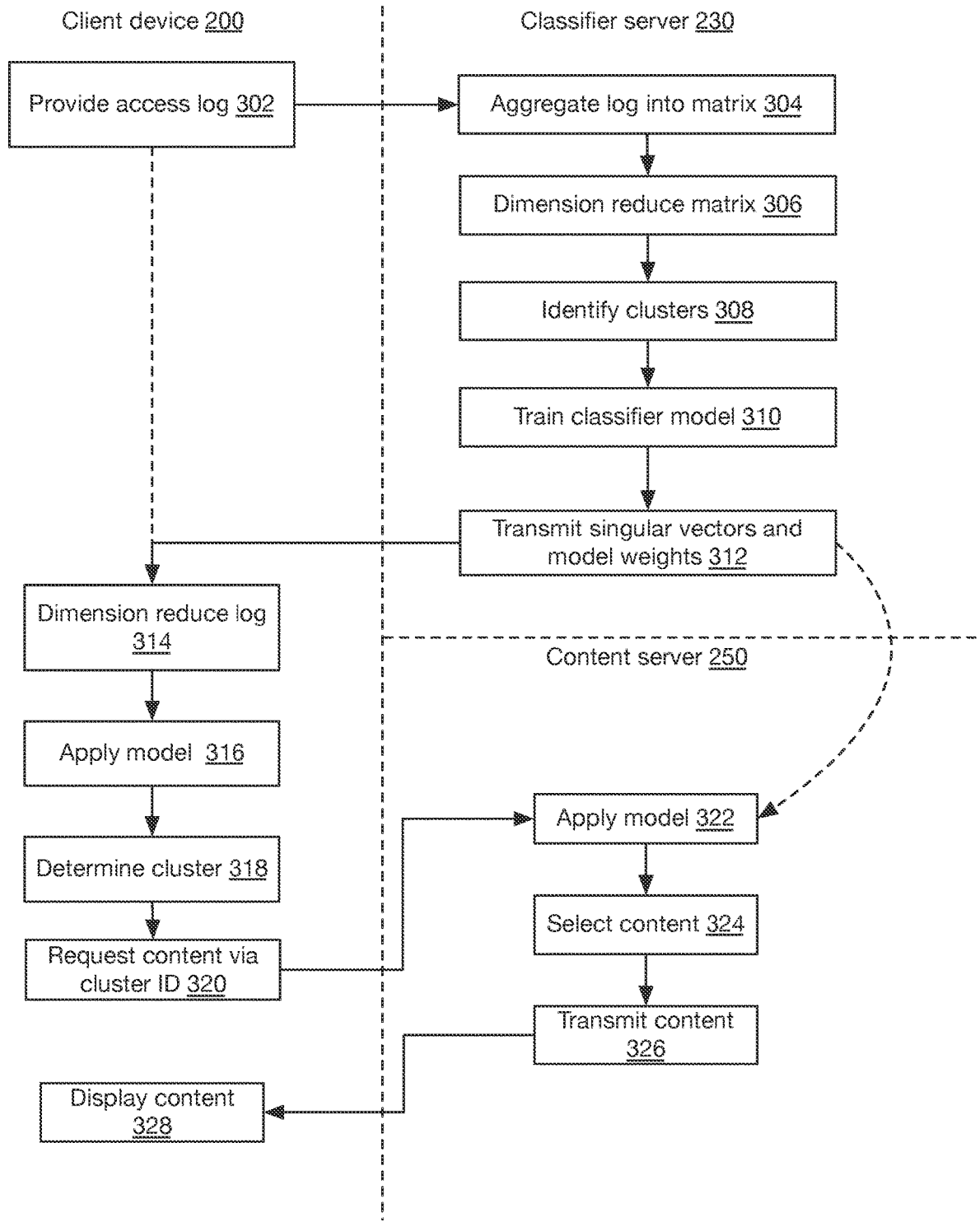
FIG. 3 is a flow chart of a method for anonymization to provide pseudo-personalized clustering, according to some implementations.

FIG. 3 is a flow chart of a method for anonymization to provide pseudo-personalized clustering, according to some implementations. At step 302, a client device 200 may provide an access log or profile vector generated from an access log to a classifier server 230. As discussed above, the profile vector may be based on a browsing or access history of the client device, and may comprise an n-dimensional vector or string with values representing each of one or more accesses to an address associated with a corresponding position in the string or array within a predetermined time period.

At step 304, a classifier server 230 may aggregate the profile vector or log from the client device 200 into a matrix with profile vectors or logs obtained from one or more additional client devices 200. The profile vectors may be obtained periodically by the classifier server 230 or upon login to a service provided by the classifier server or an associated server. Steps 302-304 may be repeated for a plurality of client devices, which may be a small fraction of all devices that may leverage the singular vectors in 312 to perform dimension reduction in 314. In some implementations, step 302 to step 312 may be replaced with federated learning on the client device and a classifier server 230 may be optional or removed.

At step 306, the classifier server 230 may calculate a dimension reduction or decomposition of the matrix. The classifier server may use a singular value decomposition algorithm in some implementations, and may generate a plurality of singular vectors and a dimension reduced matrix.

At step 308, the classifier server may optionally identify cluster boundaries or parameters of clusters of the dimension reduced matrix. The classifier server may use any appropriate algorithm, such as a principal component analysis or machine learning system, such as a neural network, to identify the clusters.

At step 310, in some implementations, the classifier model may be adjusted or trained based on the identified clusters and dimension reduced profile vectors. Training may be supervised or unsupervised, in various implementations.

At step 312, the singular vectors and, in some implementations, weights of the neural net model or other learning algorithm, may be provided to the client device(s) 200 and, in some implementations, one or more content servers 250.

At step 314, the client device 200 may calculate a dimension reduction of a profile vector or access log of the device, using the singular vectors received from the classifier server. The reduced dimension vector may be classified via an artificial intelligence or neural network, using the model parameters received from the classifier server, at step 316, and a classification determined at step 318. Determining the classification may comprise calculating a score or rank for each of a plurality of clusters (e.g. identified by the classifier server and provided via the parameters, in some implementations) for the profile vector of the device.

At step 320, the client device may transmit a request for an item of content to one or more content servers 250. The request may comprise an identification of a cluster corresponding to the profile vector of the device. The request may be generated responsive to execution of a script on a web page, after completion of playback of an item of media or portion of an item of media, or any other such circumstances.

At step 322, the content server may determine characteristics of a cluster based on the classifier model parameters and singular vectors received from the classifier server. In some implementations, the content server may use the singular vectors to calculate a profile vector representing the aggregate browsing history of all devices in the cluster, and then may infer characteristics of the cluster based on aspects of the history (e.g. keywords/topics associated with web pages or domains or other content, other associated domains or web pages, etc.). At step 324, the content server may use the cluster identification in the request (or the inferred characteristics associated with the cluster as discussed above) to select an item of content. The content may be transmitted to the client device at step 326, and the client device may render or display the content item at step 328.

Accordingly, the systems and methods discussed herein provide for content quasi-personalization or anonymized content retrieval via aggregated browsing history of a large plurality of devices, such as millions or billions of devices. A sparse matrix may be constructed from the aggregated browsing history, and dimensionally reduced, reducing entropy and providing anonymity for individual devices. Relevant content may be selected via quasi-personalized clusters representing similar browsing histories, without exposing individual device details to content providers.

In a networked environment, an application (e.g., a web browser) running on a client device can receive an information resource (e.g., a webpage) with primary content provided by a content publisher and one or more content slots (e.g., inline frames) for supplementary content. The information resource can include a code snippet or a script (e.g., a content selection tag) specifying retrieval of a content item of a content provider from a content selection service to insert into the content slots. Upon parsing of the script of the information resource, the application can generate a request for content to insert into the content slot, and can send the request to the content selection service. In response to receipt of the request, the content selection service can select one of the content items supplied by content providers to embed into the content slot of the information resource.

The selection of the content item by the content selection service can rely on the use of a deterministic tracking identifier unique to a user (or via an account), the client device operated by the user, or the application running on the client device. The identifier can be maintained on the client device and accessed by the content selection service via a cookie. The cookie can be, for example, a third-party cookie associated with a domain of the content selection service that differs from the domains of the content publishers for the information resources. When a content slot of an information resource specifies retrieval of content from the content selection service, the cookie containing the identifier can be passed from the client device to the content selection service. Using the cookie, the content selection service can track which information resources are accessed by the user via the application running on the client device. Additionally, the content selection service can identify a content item determined to be relevant to the user operating the application on the client device based on the tracked information resources.

While the use of these unique tracking identifiers allows for selection of content items customized for a particular user, there can be many drawbacks especially with regards to data security and integrity. For one, users can be exposed to data security risks over user data passed between the client devices and the content selection service. For example, the administrator of the content selection service can intentionally provide private user data to third-parties without the consent of the user. In addition, unauthorized malicious entities can intercept third-party cookies in transit, and can use the unique tracking identifier to monitor online activities of the affected client devices and applications. For another, the collection of which information resources are accessed using such identifiers can raise the specter of data breaches on the part of content selection service. For instance, an accidental release of the data or a malicious attack to exfiltrate the collected data, parts of which can be individually traced back to a specific user, can lead to a lapse in data privacy of the users.

One approach to account for the concerns with unique tracking identifier may include disabling of third-party cookies with unique tracking identifiers from the client devices. An application running on the client-device can be configured to prohibit generation, maintenance, or transmission of the unique tracking identifier to the content selection service. But the restriction of third-party cookies can raise a myriad of other issues. With the disabling of third-party cookies, the content selection service may be unable to track which information resources are accessed by the client device via the application. As such, when a request for content is received, the content selection service may not be able to use such information in determining relevancy of content items to the user operating the application. Consequently, the selected content item may have a lower likelihood of interaction by the user of the client device than a content item selected using the tracking identifier. As a result, the information resource on which the content item is inserted for displayed can suffer from a degradation in quality of human-computer interaction (HCI).

To address the technical challenges in prohibiting the use of unique identifiers to track individual client devices or applications in selecting content, each application can categorize itself into one of a multitude of clusters based on a locally maintained browsing history. Applications and by extension users operating the applications with similar browsing patterns can be categorized into the same cluster. Users with similar browsing patterns and categorized into the same cluster can be correlated as having similar traits and interests, and thus can be more likely to have a similar response to the same content items. Each cluster can have a large number of associated users (e.g., greater than 1000), and thus categorization of the user into a cluster may not be a characteristic particular to the individual user.

In assigning itself to one of the clusters, the application can convert or encode the browsing history into a vector with a preset number of dimensions. For example, one element in the feature vector can indicate whether on a particular time slot (e.g. on a particular hour of the day and particular day of week) the user visited a particular domain, a section of the website, webpages of particular category (e.g. vacation), or even a particular URL. The application can then apply a clustering or classification algorithm (e.g., k-nearest neighbors algorithm, linear classification, support vector machines, and pattern recognition) to the feature vector to identify the cluster to which to assign the application and by extension the user. The clustering algorithm can be provided and updated by an application manager (e.g., a browser vendor) for the application.

Upon finding of the cluster using the clustering algorithm, the application can identify a cluster identifier (also referred to as a class identifier or a browsing history identifier) for the cluster. The cluster identifier can be assigned to each cluster by the application manager, and can be provided to the application and the content selection services. In contrast to the unique deterministic tracking identifier, the cluster identifier may not be particular to one individual user, application, or client device. As multiple users may be categorized into the same cluster, the cluster identifier can also be common among multiple users, applications, or client devices with similar browsing patterns. Because the cluster identifier is shared among multiple users, the cluster identifiers can have a lower entropy than unique tracking identifiers assigned to individual users. For example, deterministic unique tracking identifiers for all Internet users can have an entropy of over 30-bits, whereas cluster identifiers can be set to an entropy of 18 to 22-bits. With lower entropy, the cluster identifier itself can be of a smaller length and size than unique tracking identifiers.

When an information resource with a content slot is received, the application can include the cluster identifier into a request for content for the content slot, instead of the unique tracking identifier, and send the request to the content selection service. Additional protective measures can be adopted to increase data security and integrity and to decrease the likelihood of exfiltration of the cluster identifier and related information. To protect the interception of the cluster identifier during transmission over the network, the application can use an encryption protocol, such as Hypertext Transfer Protocol Secure (HTTPS) protocol. In addition, to protect the cluster identifier maintained on the client device, the application can restrict other client-side processes (e.g., JavaScript on an information resource) from accessing the cluster identifier. For example, the cluster identifier can be included in a secure flag or an HTTP-only flag cookie maintained on the client device to prevent access to the cluster identifier. This may be in contrast to third-party cookies that do not have such access controls.

In response to receiving the request, the content selection service can use the cluster identifier to select one of the content items. The content selection service can accumulate the browsing history for users categorized as the cluster, using previous requests for content containing the cluster identifier for the cluster. Applying a profiling model to the accumulated history for the cluster, the content selection service can infer traits and interests of the users in the cluster. With the results of the profiling model, the content selection service can find a content item determined to be relevant to the cluster to which the user associated with the request is categorized.

By using the cluster identifiers, the browsing history of the application maintained on the client device may be prevented from access by the content selection service such that the browsing history is traceable to a particular user, application, or client device. Additionally, the content selection service may be unable to track individual users, applications, or client devices across different domains to assemble detailed browsing history. Instead, the content selection service can aggregate browsing histories for a particular cluster of users associated with the cluster identifier received from the applications. In aggregating, the content selection service can protect data privacy of individual users by amalgamating browser histories from different users of the same cluster. By setting the number of users to be assigned to each cluster, the degree of data privacy can be also controlled.

Furthermore, under the assumption that users in the same cluster have similar browsing patterns, the content selection service can extrapolate and determine similar traits and interests for the users of the same cluster based on the browsing history aggregated for the cluster. The content selection service can further select content items with the expectation that users of the same cluster will respond similarly. In this manner, data security, integrity, and privacy over the browsing histories of individual users can be maintained. At the same time, with the ability to determine relevancy in the selection of content items, the quality of human-computer interactions (HCI) with the selected content item or the overall information resource can be maintained.

Figure 4:
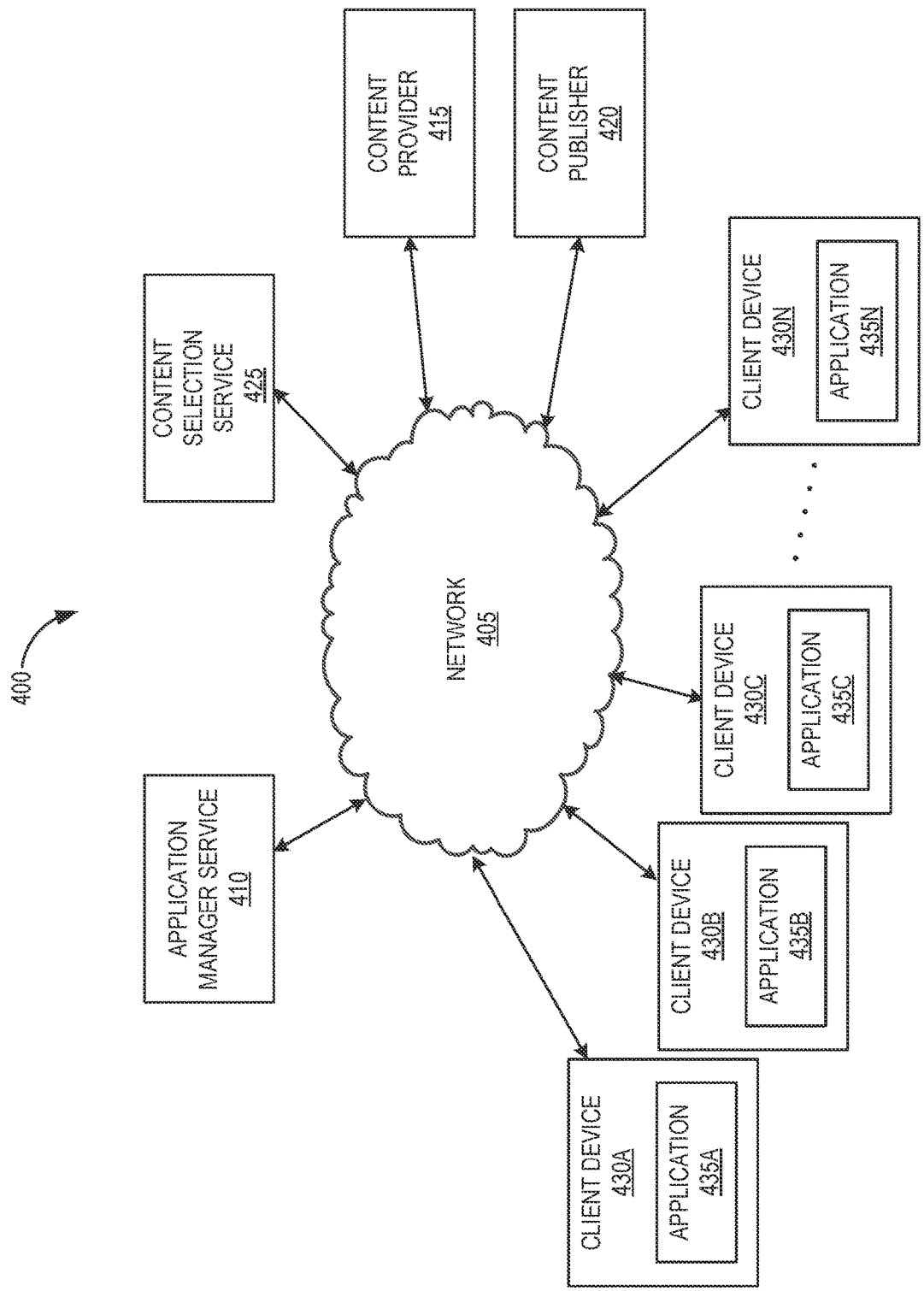
FIG. 4 is a block diagram depicting a system for encoding identifiers for selection of content using classification models, according to an illustrative implementation.

Referring now to FIG. 4, depicted is a block diagram depicting one implementation of a computer networked environment or a system 400 for encoding identifiers for selection of content using classification models. In overview, the system 400 can include at least one network 405 for communication among the components of the system 400. The system 400 can include at least one application manager service 410 (also referred herein as a browser vendor) to provide services for at least one application (e.g., a browser). The system 400 can include at least one content provider 415 to provide content items. The system 400 can include at least one content publisher 420 to provide information resources (e.g., webpages). The system 400 can include at least one content selection service 425 to select content items. The system 400 can include one or more client devices 430A-N (referred herein as client device 430 generally). Each client device 430 can include at least one application 435A-N (referred herein as application 435 generally). Each of the components (e.g., the network 405, the application manager service 410 and its components, the content provider 415 and its components, the content publisher 420 and its components, the content selection service 425 and its components, and the client device 430 and its components) of the system 400 can be implemented using the components of a computing system 900 detailed herein in conjunction with FIG. 9.

In further detail, the network 405 of the system 400 can communicatively couple the application manager service 410, the content provider 415, the content publisher 420, the content selection service 425, and the client devices 430 with one another. The application manager service 410, the content provider 415, the content publisher 420, and the content selection service 425 of the system 400 each can include a plurality of servers located in at least one data center or server farm communicatively coupled with one another via the network 405. The application manager service 410 can communicate via the network 405 with the content provider 415, the content publisher 420, the content selection service 425, and the client devices 430. The content provider 415 can communicate via the network 405 with the application manager service 410, the content publisher 420, the content selection service 425, and the client devices 430. The content publisher 420 can communicate via the network 405 with the application manager service 410, the content publisher 420, the content selection service 425, and the client devices 430. The content selection service 425 can communicate via the network 405 with the application manager service 410, the content provider 415, the content publisher 420, and the client devices 430. Each client device 430 can communicate via the network 405 with the application manager service 410, the content provider 415, the content publisher 420, and the content selection service 425.

The application manager service 410 can include servers or other computing devices operated by an application vendor (sometimes herein referred to as a browser vendor) to provide resources and updates to the applications 435 running on the client devices 430. For example, the application manager service 410 can provide the application 435 for installation to the client devices 430. The application manager service 410 can also provide updates to the application 435 installed on the client devices 430. The updates can affect at least one of the subcomponents of the application 435. The application manager service 410 can also provide plug-ins or add-ons to the application 435 to augment the functionalities of the application 435 running on the client devices 430. The application manager service 410 can communicate with the content selection service 425 to provide information on the applications 435 running on the client devices 430. The provision of the application 435 and related files or data can be communicated by the application manager service 410 over the network 405.

The content provider 415 can include servers or other computing devices operated by a content provider entity to provide content items for display on information resources at the client device 430. The content provided by the content provider 415 can take any convenient form. For example, the third-party content may include content related to other displayed content and may be, for example, pages of a website that are related to displayed content. The content may include third party content items or creatives (e.g., ads) for display on information resources, such as an information resource including primary content provided by the content publisher 420. The content items can also be displayed on a search results web page. For instance, the content provider 415 can provide or be the source of content items 455 for display in content slots (e.g., inline frame elements) of the information resource 450, such as a web page of a company where the primary content of the web page is provided by the company, or for display on a search results landing page provided by a search engine. The content items associated with the content provider 415 can be displayed on information resources besides webpages, such as content displayed as part of the execution of an application on a smartphone or other client device 430.

The content publisher 420 can include servers or other computing devices operated by a content publishing entity to provide information resources including primary content for display via the network 405. For instance, the content publisher 420 can include a web page operator who provides primary content for display on the information resource. The information resource can include content other than that provided by the content publisher 420, and the information resource can include content slots configured for the display of content items from the content provider 415. For instance, the content publisher 420 can operate the website of a company and can provide content about that company for display on web pages of the website. The web pages can include content slots configured for the display of content items provided by the content provider 415 or by the content publisher 420 itself. In some implementations, the content publisher 420 includes a search engine computing device (e.g. server) of a search engine operator that operates a search engine website. The primary content of search engine web pages (e.g., a results or landing web page) can include results of a search as well as third party content items displayed in content slots of the information resource such as content items from the content provider 415. In some implementations, the content publisher 420 can include one or more servers for providing video content.

The content selection service 425 can include servers or other computing devices operated by a content placement entity to select or identify content items to insert into the content slots of information resources via the network 405. In some implementations, the content selection service 425 can include a content placement system (e.g., an online ad server). The content selection service 425 can maintain an inventory of content items to select from to provide over the network 405 for insertion into content slots of information resources. The inventory may be maintained on a database accessible to the content selection service 425. The content items or identifiers to the content items (e.g., addresses) can be provided by the content provider 415.

Each client device 430 can a computing device to communicate via the network 405 to display data. The displayed data can include the content provided by the content publisher 420 (e.g., the information resource) and the content provided by the content provider 415 (e.g., the content item for display in a content slot of the information resource) as identified by the content selection service 425. The client device 430 can include desktop computers, laptop computers, tablet computers, smartphones, personal digital assistants, mobile devices, consumer computing devices, servers, clients, digital video recorders, a set-top box for a television, a video game console, or any other computing device configured to communicate via the network 405. The client device 430 can be communication devices through which an end user can submit requests to receive content. The requests can be requests to a search engine and the requests can include search queries. In some implementations, the requests can include a request to access a web page.

The application 435 executing on the client device 430 can include, for example, an Internet browser, a mobile application, or any other computer program capable of executing or otherwise invoking computer-executable instructions provided to the client device 430, such as the computer-executable instructions included in the information resource and the content item. The information resource included therein can correspond to a script, logic, markup, or instructions (e.g., HyperText Markup Language (HTML), Extensible HyperText Markup Language (XHTML), Extensible Markup Language (XML), Cascading Style Sheets (CSS), and JavaScript, or any combination thereof). A content item may be inserted into a content slot of the information resource.

Figure 5:
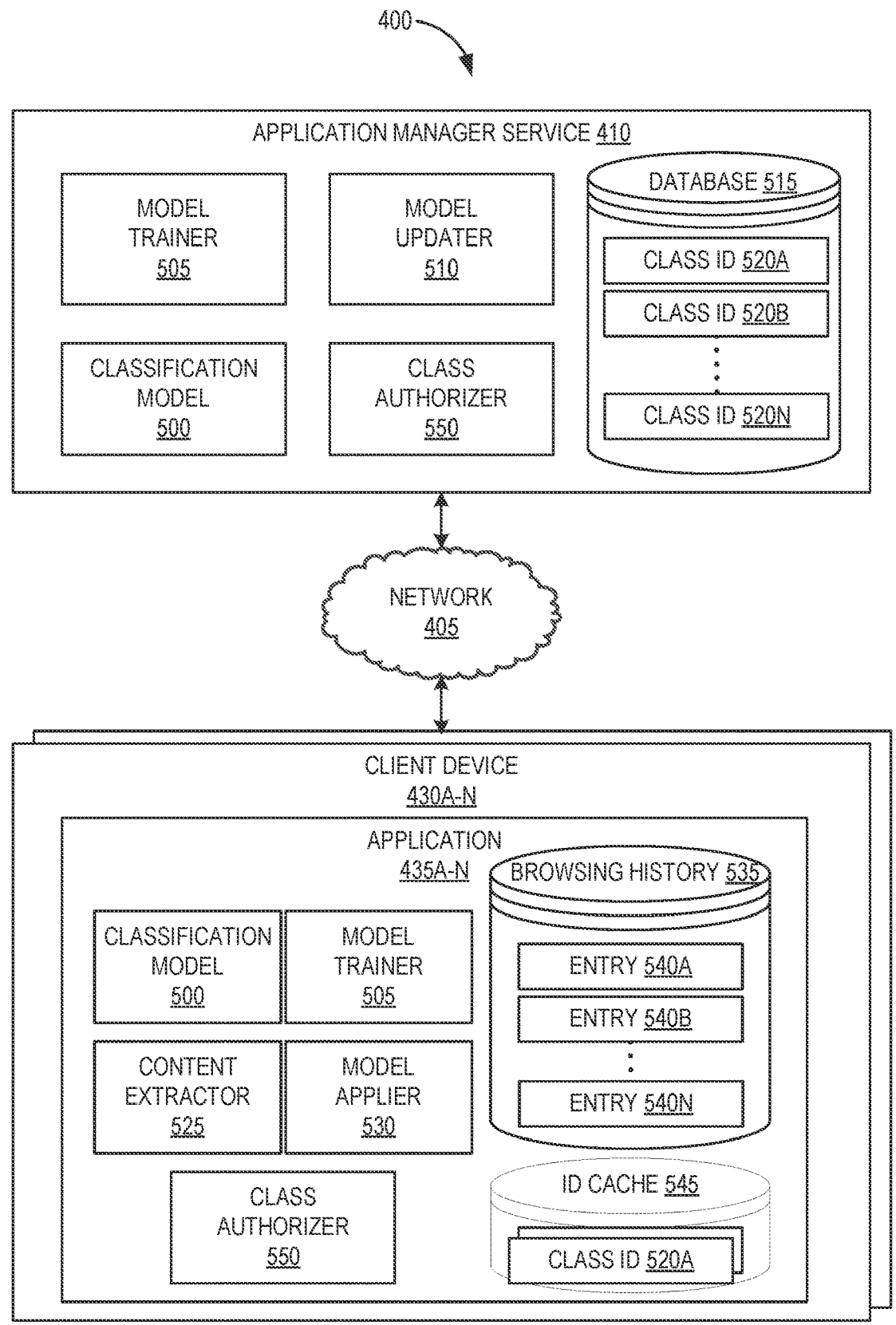
FIG. 5 is a block diagram depicting a client device and an application management service in a system for encoding identifiers for selection of content using classification models, according to an illustrative implementation.

Referring now to FIG. 5, depicted is a block diagram depicting one implementation of the client devices 430 and the application management service 410 in the system 400. In overview, the application manager service 410 can include at least one classification model 500 to categorize applications 435 based on browsing pattern. The application manager service 410 can include at least one model trainer 505 to train and maintain at least one classification model 500. The application manager service 410 can include at least one model updater 510 to change or adjust the classification model 500. The application manager service 410 can include at least one database 515 to store and maintain a set of class identifiers 520A-N (referred herein as a class identifier 520 generally and sometimes referred herein as a "web zone identifier" or a "web zip code"). The application manager server 410 can include at least one instance of a class authorizer 550 (sometimes referred herein as a class authentication service) to permit the inclusion of class identifiers 520 in requests transmitted via the network 405.

On each client device 430, the application 435 can include at least one classification model 500 to categorize the application 435 based on browsing patterns. The application 435 can include at least one model trainer 505 to train and maintain the classification model 500. The application 435 can include at least one content extractor 525 to select features from information resources accessed via the application 435. The application 435 can include at least one model applier 530 to use the classification model 500 to category the application 435. The application 435 can also include at least one instance of the class authorizer 550. The model trainer 505, the content extractor 525, the model applier 530, and the class authorizer 550 can be an integral part of the application 435, an add-on or plug-in to the application 435, or a separate application interfacing with the application 435. The application 435 can include at least one browsing history 535 to maintain and store one or more entries 540A-N (referred herein as an entry 540 generally). The application 435 can include at least one identifier cache 545 to maintain and store at least one class identifier 520 for the application 435.

In further detail, the classification model 500 can classify, group, or otherwise categorize each application 435 (or each client device 430 running the application 435 or an account associated with the application 435) based on the browsing history 535. The classification of the application 435 on the client device 430 can indicate or denote the classification of an instance of the application 435 running on the client device 430. For example, there can be an instance of one application 435 (e.g., the web browser) running on one client device 430 and another instance of the application 435 (e.g., the same type of web browser) running on another client device 430. Both instances can be classified into the same category or different categories. Furthermore, the classification of the application 435 can by extension correspond to or include classification of a user associated with the account operating the application 435 or the client device 430 operated by the user.

The classification model 500 can be a classification or clustering model or algorithm. The classification model 500 can include a classification algorithm, such as a linear classifier (e.g., linear regression, logistic regression, and naïve Bayes classifier), a support vector machine (SVM), a quadratic classifier, a k-nearest neighbor algorithm, and artificial neural networks (ANN), among others. The classification model 500 can include a clustering model, such as a centroid-based clustering algorithm (e.g., k-means algorithm or expectation-maximization (EM) algorithm), a density-based clustering algorithm (e.g., Density-based spatial clustering of applications with noise (DBSCAN)), a distribution-based clustering algorithm (e.g., Gaussian mixture model), and artificial neural networks (ANN), among others. The classification model 500 can also include a hash function, such as a locality-sensitive hashing scheme (e.g., MinHash, SimHash, and Nilsimsa Hash), among others.

The classification model 500 can include a set of inputs, a set of parameters, and a set of outputs in accordance to any of the classification or clustering models and algorithms. The set of inputs can take in or include the entries 540 of the browsing history 535. In some implementations, the set of inputs can take in or include a reduced dimension representation of the entries 540 of the browsing history 535. In some implementations, the set of inputs can include the full representation of the entries 540 of the browsing history 535. The set of parameters (or weights) can connect or relate the set of inputs with the set of outputs. In some implementations, the set of parameters can include a number of classes and values for each class. For example, the set of parameters may be centroids in k-means clustering for each class. In another example, the set of parameters may include ranges of values associated with each class. The number of classes can equal a number of class identifiers 520. The number of classes and the number of class identifiers 520 can be predetermined (e.g., to a fixed value) or dynamically determined. The set of outputs can produce or include a class corresponding to one of the class identifiers 520. The set of outputs can include one of the class identifiers 520 itself. For example, the class identifier 520 can be a hash value computed using a hash function. Each class identifier 520 can be or include a set of alphanumeric characters or a numeric value (e.g., an integer or binary number).

The model trainer 505 executing on the application manager service 410 can train the classification model 500. The model trainer 505 can use a training dataset to train the classification model 500. The training of the classification model 500 can be in accordance with unsupervised learning techniques. The training dataset can include sample browsing histories 530 from a sample set of applications 435 running on a sample set of client devices 430. In some implementations, the model trainer 505 can acquire and accumulate the sample browsing histories 530 from the content provider 415, the content publisher 420, the content selection service 425, or the applications 435 running on the client devices 430. Prior to training, the model trainer 505 can identify the number of classes for the classification model 500. In some embodiments, the number of classes may be pre-determined or assigned by an administrator of the application manager service 410. In some implementations, the number of classes may be determined by the model trainer 505 based on a number of client devices 430 with the application 435. For example, the number of classes may be set such that a set number of client devices 430 (e.g., 800 to 1000 devices) are to be assigned to each class.

In training the classification model 500, the model trainer 505 can change, adjust, or otherwise set values of the parameters (e.g., the values for each class) in the classification model 500 using the training dataset. At each iteration, the model trainer 505 can determine whether the classification model 500 has converged relative to the previous iteration based on a change in the set of values of the parameters. In some implementations, the model trainer 505 can compare the change in the set of values in the parameters for the classification model 500 to a convergence threshold. If the change is less than the convergence threshold, the model trainer 505 can determine that the classification model 500 has converged. Otherwise, if the change is greater than the convergence threshold, the model trainer 505 can determine that the classification model 500 has not converged. When the classification model 500 is determined not to have converged, the model trainer 505 can continue training the classification model 500.

Otherwise, when the classification model 500 is determined to have converged, the model trainer 505 can end, terminate, or cease training the classification model 500. The model trainer 505 can store the classification model 500 on the application manager service 410. In addition, the model trainer 505 can transmit or send the classification model 500 to the application 435 running on the client device 430. In some implementations, the model trainer 505 can transmit or send the set of parameters for the classification model 500. For each class in the classification model 500, the model trainer 505 can identify, assign, or otherwise associate the class to a corresponding class identifier 520. The class identifier 520 can be a set of alphanumeric characters to reference the class. The classification model 500 can associate each class to the corresponding class identifier 520. The model trainer 505 can transmit and provide the set of class identifiers 520 to the application 435 running on each client device 430 and to the content selection service 425.

The model trainer 505 of the application 435 executing on the client device 430 can also train the classification model 500. In some implementations, the model trainer 505 can use a distributed learning protocol to train the classification model 500. The distributed learning protocol can be in concert with the applications 435 executing on other client devices 430 and the application manager service 410 in communication over the network 405. The distributed learning protocol can include, for example, federated learning using an optimization algorithm (e.g., a stochastic gradient descent (SGD) or averaging) to train the classification model 500. The number of classes and the number of class identifiers 520 can be predetermined (e.g., to a fixed value) or dynamically determined as discussed above. During each iteration, each model trainer 505 can change, adjust, or otherwise set values of the parameters (e.g., the values for each class) in the classification model 500 using the training dataset. At the end of the iteration, each model trainer 505 can provide to one another (instances of the model trainer 505 on other client devices 430) the values of the parameters (e.g., the values for each class) in the classification model 500. The model trainer 505 can use the received values of the parameters to adjust, change, or set the parameters on the locally maintained classification model 500. The model trainer 505 can repeat iterations until the determination that the classification model 500 has converged relative to the previous iteration based on a change in the set of values of the parameters as discussed above.

The model updater 510 executing on the application manager service 410 can provide or send an update to the classification model 500 maintained on each client device 430 running on the application 435. The model updater 510 can determine whether to update the classification model 500 in accordance with a model update policy. The model update policy can specify a set of conditions under which the classification model 500 is to be updated. In some implementations, the model update policy can include a schedule indicating times at which to update the classification model 500. The model update policy can specify that the classification model 500 is to be updated when the number of applications 435 assigned to each class is not evenly distributed (e.g., the difference of class size is within 5% to 100% of one another class). The model update policy can specify that the classification model 500 is to be updated when an amount of additional browsing history 535 accumulated satisfies a threshold amount. If the determination is not to update the classification model 500, the model updater 510 can maintain the classification model 500.

On the other hand, if the determination is to update, the model updater 510 can invoke the model trainer 505 (on the application manager service 410 or across the applications 435 running on the client devices 430) to re-train the classification model 500. In some implementations, the model updater 510 can accumulate the browsing histories 530 for the training dataset from the content provider 415, the content publisher 420, the content selection service 425, or the applications 435 running on the client devices 430. The model updater 510 can pass the accumulated browsing histories 530 to the model trainer 505 to re-train the classification model 500. Upon determining that the classification model 500 has converged, the model trainer 505 can end, terminate, or cease training the classification model 500. The model updater 510 can transmit or send the newly trained classification model 500 (or the set of parameters for the classification model 500) to each application 435 to update the classification model 500. The model updater 510 can transmit and provide the set of class identifiers 520 to the application 435 running on each client device 430 and to the content selection service 425.

The model applier 530 of the application 435 executing on the client device 430 can receive the classification model 500 from the application manager service 410 via the network 405. Upon receipt, the model applier 530 can store and maintain the classification model 500 on the client device 430. In some implementations, the model applier 530 can receive the set of parameters for the classification model 500 from the application manager service 410. The receipt of the set of parameters can be to update the classification model 500. Upon receipt, the model applier 530 can change, configure, or otherwise modify the classification model 500 using the received set of parameters. In addition, the model applier 530 can receive the set of class identifiers 520 for the classes in the classification model 500 from the application manager service 410. The receipt of the class identifiers 520 may be as part of the updating of the classification model 500.

With the configuration of the classification model 500, the model applier 530 can identify the browsing history 535 maintained on the client device 430 by the application 435. The application 435 can maintain the browsing history 535 by creating an entry 540 each time an information resource is accessed. The browsing history 535 can record information resources (e.g., webpages) and other online content accessed via the application 435. The browsing history 535 can include the set of entries 540. Each entry 540 can include an address for the accessed information resource (e.g., a Uniform Resource Locator (URL) including a hostname and pathname for the webpage) and a timestamp indicating a time that the information resource was accessed. The set of entries 540 can be indexed by the timestamp or the address for the information resource within the browsing history 535. In some implementations, the model applier 530 can identify a portion of the browsing history 535 over a time range with which to further processing by the model applier 530. The portion of the browsing history 535 can include a subset of entries 540 with timestamps within the time range. The time range can be, for example, a week's amount of entries 540 from the current time.

In conjunction, the content extractor 525 of the application 435 executing on the client device 430 can identify, select, or otherwise extract one or more features from each information resource for the corresponding entry 540 in the browsing history 535. The features can be extracted from at least a portion of content on the information resource. The features can include, for example, textual data, visual data, or audio data. In some implementations, the content extractor 525 can identify the features from the content of the information resource, as the application 435 accesses the information resource via the network 405. In some implementations, the content extractor 525 can access each information resource via the corresponding entry 540 in the browsing history 535 to extract the feature. The accessing may be separate from or subsequent to the presentation of the information resource via the application 435.

In extracting from the information resources, the content extractor 525 can apply one or more attribute selection algorithms to the content of each information resource accessed by the application 535. To extract textual data, the content extractor 525 can apply at least one natural language processing algorithm, such as term extraction, named entity recognition, relationship extraction, automatic summarization, and term frequency-inverse document frequency (tf-idf) among others. The textual data identified using the natural language processing algorithm can include a subset of the textual content on the information resource. To extract visual data, the content extractor 525 can apply at least one computer vision algorithm, such as object recognition and optical character recognition (OCR. The visual data identified using the computing vision algorithm can include a subset of the graphics on the information resource (or an identifier corresponding to the subset). To extract audio data, the content extractor 525 can apply at least one audio signal analysis algorithm and speech recognition algorithm. The extracted audio data can include, for example, words recognized from the audio, among others.

Upon identifying the browsing history 535, the model applier 535 can form or generate a set of feature vectors using the entries 540 of the browsing history 535. In some implementations, the model applier 535 can generate the set of feature vectors using the features extracted from the information resources accessed by the application 435. The set of feature vectors may be used as input for the classification model 500. The set of feature vectors can include or can be defined by dimensions. The dimensions can include time ranges (e.g., hours of a day or day of the week) and address attributes (e.g., a domain name, a section of the website, a topic category, or the address itself). The dimensions can also include the text data, image data, and audio data corresponding to the extracted features. Each feature vector can be associated with at least one of the time range based on the timestamp associated with the corresponding entry 540. Each feature vector can be associated with at least one of the address attributes for the information resource based on the address for the information resource identified in the corresponding entry 540.

In some implementations, the model applier 535 can generate the set of feature vectors by projecting the entries 540 of the browsing history 535 onto the dimensions of the feature vectors defined by the time ranges and address attributes. For each entry 540 of the browsing history 535, the model applier 535 can identify whether an existing feature vector exists based on the address and the timestamp in the entry 540. To identify, the model applier 530 can determine whether the entry 540 matches any of the existing feature vectors. When an existing feature vector exists, the model applier 535 can add the entry 540 to the feature vector. Conversely, when an existing feature does not exist, the model applier 535 can create a new feature vector for the entry 540.

In some implementations, the model applier 535 can use a dimension reduction process to form or generate a set of reduced feature vectors. The dimension reduction process can include linear reduction techniques (e.g., principal component analysis (PCA), singular value decomposition (SVD), non- and negative matrix factorization (NMF)), non-linear dimension reduction (e.g., generalized discriminant analysis (GDA), locally-linear embedding, and Sammon's mapping), or others (e.g., Johnson-Lindenstrauss lemma and multifactor dimensionality reduction), among others. In some implementations, the model applier 530 can apply the dimension reduction process in projecting the entries 540 of the browsing history 535 onto the dimensions of the feature vectors. In some implementations, the model applier 535 can apply the dimensions reduction process onto the generated set of feature vectors. With the application of the dimension reduction process, the model applier 535 can reduce a number of dimensions in the original set of feature vectors to generate the set of reduced feature vectors. The set of reduced feature vectors can have a lower number of dimensions and data points than the initial set of reduced feature vectors. For example, the set of reduced feature vectors can omit time ranges or address attributes without any associated entries 540. In some implementations, the model applier 535 can omit the dimension reduction process and continue processing the feature vectors without the dimension reduction process.

The model applier 530 can apply the classification model 500 to the browsing history 535 (or any subset or representation of the entries 540 of the browsing history 535 such as the feature vectors) to identify one or more classes in which to categorize the application 435. To apply, the model applier 530 can feed the browsing history 535 as the set of inputs of the classification model 500. In some implementations, the model applier 530 can feed the set of feature vectors or reduced feature vectors as the inputs of the classification model 500. Once fed, the model applier 530 can use the classification model 500 to compare the inputs to the parameters defining the classes and to generate or produce a set of outputs based on the comparison. The set of outputs can include the one or more classes to which to categorize the browsing pattern as indicated in the browsing history 535 maintained by the application 435.

From the output of the classification model 500, the model applier 530 can identify the one or more classes. In some implementations, the model applier 530 can identify a single class (sometimes herein referred to as the nearest or closest class) from the output. The single class can correspond to a portion of the feature space defined by the classification model 500 closest in distance from the input feature vector. The feature space defined by the classification model 300 can have the same parameters and the values thereof as the input.

In some implementations, the model applier 530 can identify a set of classes (sometimes herein referred to as nearest or closest classes) from the output. The identified set may be a subset of classes defined by the classification model 500. The member classes of the set can be within a proximity threshold of one another in a feature space defined by the classification model 300. The proximity threshold can define a distance within the feature space within which the one or more classes are to be selected. In some implementations, the model applier 530 can identify the set of classes within the proximity threshold of the feature vector inputted into the classification model 500. In some implementations, the model applier 530 can rank the set of classes by distance from the input feature vector within the feature space.

Each identified class may correspond to one of the number of classes as defined by the classification model 500. The identified class for the application 435 running on the client device 430 can be common, shared, or identical with the identified class for at least some other applications 435 running on other client devices 430. As discussed above, each class defined by the classification model 500 can have a number of client devices to be categorized into the class.

With the identification of the one or more classes for the application 435, the class authorizer 550 can determine whether each class satisfies (e.g., greater than or equal to) a threshold number of applications 435 assigned to the class. The threshold number can demarcate or define the number of applications 435 assigned to the class at which the class can be used to generate requests for content. The threshold number can be set to match or achieve a target entropy. There may be multiple applications 435 assigned by each individual instance of the model applier 530 to the same class. Not until the number of such applications 435 exceeds the threshold number, however, can the class be used for generating requests for content. The determination by the application 435 on the client device 435 may be in concert or in coordination with a class authentication service, such as the class authorizer 550 executing on the application manager service 410. The functionalities of the class authorizer 550 can be split between the application 435 and the application manager service 410 (or some other server device). The determination can be in accordance with a threshold cryptographic protocol or a check against a probabilistic data structure.

In some implementations, the class authorizer 550 of the application 435 and the class authorizer 550 of the application manager service 410 can perform a threshold cryptographic protocol in making the determination. For each identified class, the class authorizer 550 on the application 435 can identify the class identifier 520 corresponding to the class. Upon identification, the class authorizer 550 can generate an encrypted copy of the class identifier 520. In some implementations, the class authorizer 550 can generate the encrypted copy using at least a portion of a private encryption key in accordance with an asymmetric cryptography algorithm. The asymmetric cryptography algorithm may include, for example, a digital signature, Diffie-Hellman key exchange, elliptic curve cryptography, or Rivest-Shamir-Adleman (RSA) algorithm, among others. The class authorizer 550 of the application 435 can generate a request to authenticate including the encrypted copy of the class identifier 520. Once generated, the class authorizer 550 of the application 435 can transmit the request to the class authorizer 550 on the application manager service 410 via the network 405.

Upon receipt from the client device 430, the class authorizer 550 executing on the application manager service 410 can parse the request to authenticate to identify the encrypted copy of the class identifier 520. With the identification, the class authorizer 550 can attempt to decrypt the original class identifier 520 from the encrypted copy of the class identifier 520. The decryption can be in accordance with an asymmetric cryptographic algorithm. Under the threshold cryptographic protocol, until the number of received requests to authenticate with the encrypted copies of the same class identifier 520 satisfies the threshold number, the class authorizer 550 may be unable to successfully decrypt the encrypted copy. The inability to decrypt may be, for example, because the class authorizer 550 may not have received enough portions of the private keys of requests from different applications 435. Once enough portions of the private key are received, the class authorizer 550 may be able to successfully decrypt the encrypted copy to recover the original class identifier 520.

The class authorizer 550 can generate an output from the decryption of the encrypted copy. If the number of requests with the encrypted copies for the same class identifier 520 does not satisfy the threshold (e.g., less than), the class authorizer 550 may be unable to recover the original class identifier 550 from the decryption. The output generated from the attempted decryption may thus not match the original class identifier 520. On the other hand, if the number of requests with the encrypted copies for the same class identifier 520 satisfies the threshold (e.g., greater than or equal to), the class authorizer 550 may recover the original class identifier 550 from the decryption. The output generated from the attempted decryption may thus match the original class identifier 520. Using the resultant output, the class authorizer 550 can generate a response including the output. Once generated, the class authorizer 550 on the application manager service 510 can transmit the response with the resultant output over network 405 to the client device 430.

The class authorizer 550 of the application 435 can in turn receive the response from the class authorizer 550 running on the application manager service 410. Upon receipt, the class authorizer 550 can parse the response to identify the resultant output from the decryption attempt. The class authorizer 550 can compare the resultant output with the class identifier 520 corresponding to the class included in the request to authenticate. When the resultant output is determined to match, the class authorizer 550 can determine that the class satisfies the threshold number of applications 435. The model applier 530 can continue using the class and the corresponding class identifier 520. Conversely, when the resultant output is determined to not match, the class authorizer 550 can determine that the class does not satisfy the threshold number of applications 435. The model applier 530 can discard the class and the corresponding class identifier 520 from further use. In addition, the class authorizer 550 can repeat the threshold cryptographic protocol with another class to find the class to use in requests for content.

In some implementations, for each identified class, the class authorizer 550 of the application 435 can check the class identifier 520 corresponding to the class against at least one data structure to make the determination. The data structure can be maintained by the class authorizer 550 running on the application manager service 410 (e.g., on the database 515). The data structure can indicate whether any application 435 is assigned to the class. The data structure can also indicate whether the number of applications 435 assigned to the class satisfies the threshold number. In some implementations, the data structure may be a probabilistic data structure. The probabilistic data structure can include, for example, a counting bloom filter, a quotient filter, a cuckoo filter, a count-min sketch, among others.

To perform the check, the class authorizer 550 of the application 435 can generate a request to authenticate including the class identifier 520 corresponding to the class. Upon generation, the class authorizer 550 can send the request to authenticate to the class authorizer 550 running on the application manager service 410. The class authorizer 550 on the application manager service 410 can in turn receive the request to authenticate. The class authorizer 550 can parse the request to authenticate to identify the class identifier 520. The class authorizer 550 can apply the data structure to determine whether the number of applications 435 assigned to the class satisfies the threshold number. In applying the data structure, the class authorizer 550 can feed the class identifier 520 included in the request into the data structure and identify an output from the data structure. In addition, each time the request to authenticate is received, the class authorizer 550 can update the data structure for classes maintained by the application manager service 410.

If the data structure indicates that the number satisfies the threshold number (e.g., greater than or equal to), the class authorizer 550 on the application manager service 410 can generate a success response. The response can indicate that the number of applications 435 satisfies the threshold. The class authorizer 550 on the application manager service 410 can send the success response to the class authorizer 550 on the application 435. Based on receiving the success response, the class authorizer 550 of the application 435 can identify the response as indicate that the threshold number is satisfied. In addition, the model applier 530 can continue using the class and the corresponding class identifier 520.

On the other hand, if the data structure indicates that the number does not satisfy the threshold number (e.g., less than), the class authorizer 550 on the application manager service 410 can generate a failure response. The response can indicate that the number of applications 435 does not satisfy the threshold. The class authorizer 550 on the application manager service 410 can send the failure response to the class authorizer 550 on the application 435. Based on receiving the failure response, the class authorizer 550 of the application 435 can identify the response as indicate that the threshold number is not satisfied. The model applier 530 can discard the class and the corresponding class identifier 520 from further use. In addition, the class authorizer 550 can repeat the check with another class to find the class to use in requests for content.

Upon the determination that at least one of the classes satisfies the threshold number of applications 435 assigned to the class, the model applier 530 can assign the application 435 to the corresponding class identifier 520 for the class. In some implementations, the model applier 530 can identify the class identifier 520 corresponding to the nearest class determined to be satisfying the threshold number. By default, the class identifier 520 assigned by the model applier 530 to the application 435 can correspond to the nearest class. In some implementations, the model applier 530 can use the classification model 500 to identify the class identifier 520 associated with the identified class. With this identification, the model applier 530 can then assign the class identifier 520 to the application 435. The assignment of the class identifier 520 to the application 435 can indicate that the browsing history 535 for the application 435 is similar to the other browsing histories 530 on other applications 435 with the same class identifier 520. The class identifier 520 assigned to the application 435 running on the client device 430 can be common, shared, or identical with the class identifier 520 for at least some other applications 435 running on other client devices 430.

With the assignment, the model applier 530 can store and maintain the class identifier 520 onto the identifier cache 545. For example, as depicted, the model applier 530 of the first application 435A may have identified the first application 435A as having similar browsing patterns as other applications 435B-N with the class corresponding to the first class identifier 520A. The identifier cache 545 can control access of scripts executed by the application 435 from accessing the class identifier 520. In some implementations, the model applier 530 can store the class identifier 520 in a secure cookie maintained on the identifier cache 545. The secure cookie can include a cookie with a secure flag or the HTTP-only flag set. The secure cookie can prevent scripts on information resources from accessing the class identifier 520 maintained on the identifier cache 545. In addition, the secure cookie can permit authorized entities to access to the class identifier 520 stored on the identifier cache 545. The secure cookie can identify the content selection service 425 or the application manager service 410 as permitted for accessing the class identifier 520 on the identifier cache 545.

The model applier 535 can determine whether to apply the classification model 500 in accordance with an identifier assignment policy. The identifier assignment policy can specify a set of conditions under which the classification model 500 is to be applied for reassignment of the class identifier 520. In some implementations, the identifier assignment policy can include a schedule indicating times at which to apply the classification model 500. The identifier assignment policy can specify that the classification model 500 is to be updated when a new update to the application 435 is provided by the application manager service 410. The identifier assignment policy can specify that the classification model 500 is to be applied when an amount of additional browsing history 535 accumulated satisfies a threshold amount. If the determination is not to re-apply the classification model 500, the model applier 530 can maintain the class identifier 520. On the other hand, if the determination is to re-apply the classification model 500, the model applier 530 can repeat the above described functions. For example, the model applier 530 can identify the browsing history 535, use the dimension reduction process to generate a set of reduced feature vectors, apply the classification model 500 to the set of reduced feature vectors to identify the class, and assign the classifier identifier 520 associated with the identified class to the application 435.

Figure 6:
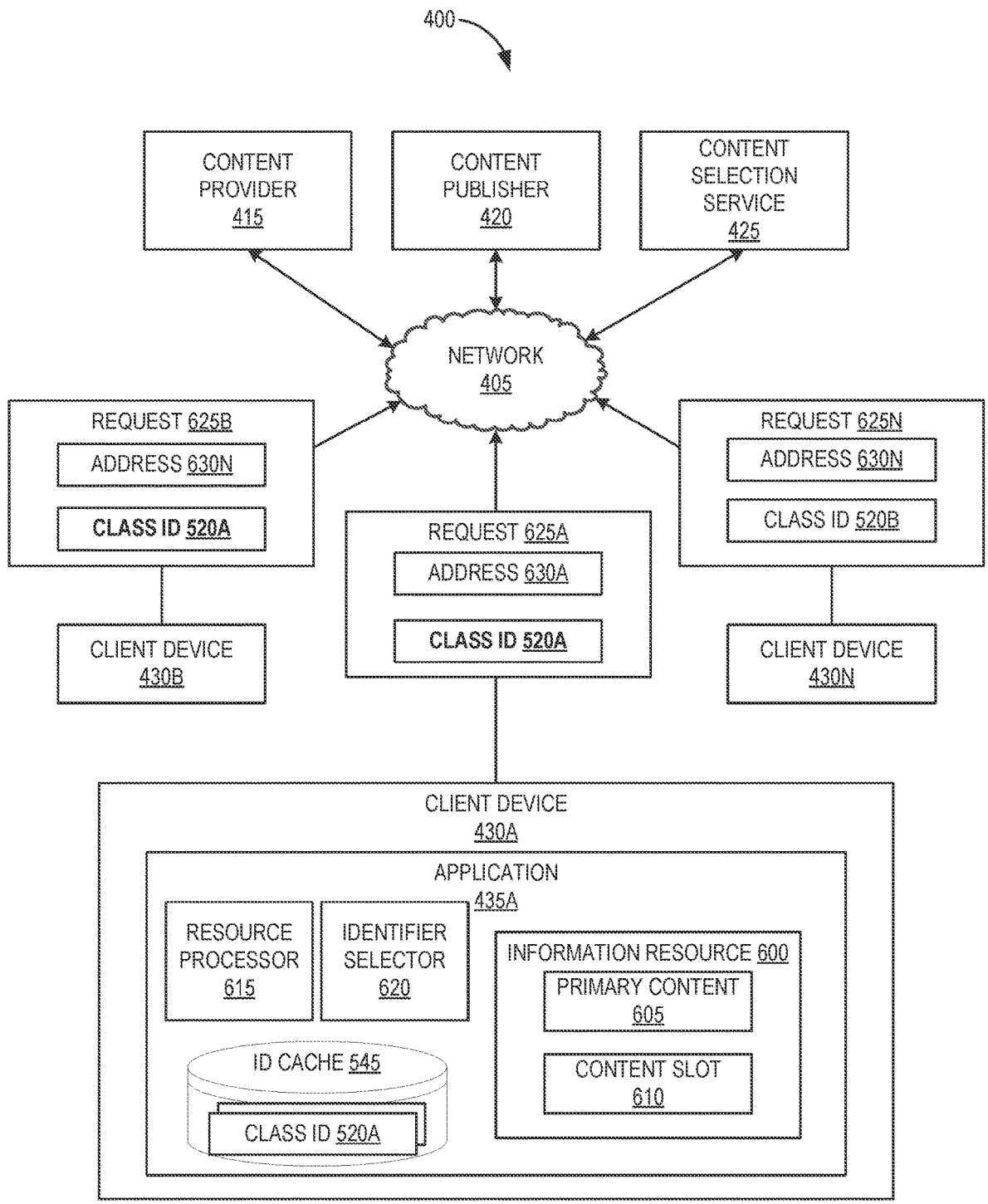
FIG. 6 is a block diagram depicting a client device, a content provider, a content publisher, and a content selection service in a system for encoding identifiers for selection of content using classification models, according to an illustrative implementation.

Referring now to FIG. 6, depicted is a block diagram depicting one implementation of the client devices 430, the content provider 415, the content publisher 420, and the content selection service 425 in the system 400. In overview, the application 435 on each client device 430 (e.g., as depicted for the first client device 430A) can include at least one resource processor 615 to handle reading and parsing of at least one information resource 600 and other data communicated with the content provider 415, the content publisher 420, or the content selection service 425. The application 435 can also include at least one identifier selector 620 to determine which class identifier 520 to insert into requests for content sent via the network 405.

In further detail, the resource processor 615 executing on the client device 430 can receive the information resource 600 from the content publisher 420. The receipt of the information resource 600 can be in response to a request for the information resource 600 sent by the application 435 to the content publisher 420 and can be for presentation at the client device 430. The received information resource 600 (e.g., a webpage) can include at least one primary content 605 (e.g., body, text, and images of the webpage) and at least one content slot 610 (e.g., an inline frame of a webpage). The primary content 605 can correspond to a portion of the information resource 600 that is provided by the content publisher 420. The content slot 610 can be available to receive content from the content provider 415 or the content selection service 425. The content to be inserted into the content slot 610 can have a different hostname from the hostname of the information resource 600. Once received, the resource processor 615 can parse the information resource 600 including the primary content 605 and the content slot 610.

For the content slot 610 of the information resource 600, the resource processor 615 can generate a request 625A-N (herein referred to generally as request for content 625) to send to the content selection service 425. The generation of the request for content 625 can be in accordance to a script (e.g., an ad tag or a content selection tag) for inserting content into the content slot 610. The script for the content slot 610 can be embedded or included in the content slot 610 itself or another portion of the information resource 600). In generating the request for content 625, the resource processor 615 can include an address 630A-N (herein referred to generally as address 630) into the request for content 625. The address 630 can reference the content selection service 425 specified by the script for the content slot 610, such as an URL for the content selection service 425. The address 630 can indicate a destination address to which the request for content 625 is to be routed. Furthermore, the resource processor 615 can include a source address referencing the client device 430 into the request for content 625. The resource processor 615 can also include the address corresponding to the content publisher 420 that provided the application 435 with the information resource 600.

Additionally, the identifier selector 620 can identify or otherwise select which of the class identifiers 520 to insert into the request for content 625 in accordance with at least one obfuscation policy (sometimes referred herein as a divulgation policy). The obfuscation policy can specify one or more conditions under which class identifiers 520 are permitted or restricted from inclusion in requests for content 625. In some implementations, the conditions of the obfuscation policy can be particular to one or more information resources 600, the primary content 605 of the information resources 610, or the content slots 610 of the information resources 600, or any combination thereof. In some implementations, the conditions can be dependent on the entries 540 of the browsing history 535. For example, the conditions of the obfuscation policy can specify that another class identifier 520 or no class identifier 520 is to be included in requests for content 625 for information resources 600 access for the first time via the application 435. In another example, the conditions of the obfuscation policy can specify that another class identifier 520 is to be used for information resources 600 seldom visited (or accessed below a threshold number as indicated by the browsing history 535) by the application 435. In another example, the obfuscation policy can specify that the no class identifier 520 is to be used unless the information resource 600 received is in accordance with the Hypertext Transfer Protocol Secure (HTTPS) protocol. In this manner, the obfuscation policy can further protect data privacy over accessing information resources 600 via the application 435 over the network 405.

In selecting according to the obfuscation policy, the identifier selector 620 can identify one or more conditions to compare against the obfuscation policy. In some implementations, the identifier selector 620 can identify the information resource 600 including contents and individual parts of the address (e.g., protocol, domain name, and path name). In some implementations, the identifier selector 620 can identify individual primary content 605 on the information resource 600. In some implementations, the identifier selector 620 can identify the content slot 610 for which the request for content 625 is to be generated. In some implementations, the identifier selector 620 can identify the entries 540 of the browsing history 535 of the application 435. With these identification, the identifier selector 620 can compare against the conditions specified by the obfuscation policy. If the conditions are determined to not match, the identifier selector 620 can maintain the class identifier 520 to be included in the request for content 625.

On the other hand, if the conditions are determined to match, the identifier selector 620 can determine whether the obfuscation policy specifies permission or the restriction of the class identifier 520. When the obfuscation policy specifies that the class identifier 520 is permitted, the identifier selector 620 can maintain the class identifier 520 to be included in the request for content 625. Conversely, when the obfuscation policy specifies that the class identifier 520 is restricted, the identifier selector 620 can find another class identifier 520 or no class identifier 520. In some implementations, the obfuscation policy can specify that another class identifier 520 is to be used under such conditions. Accordingly, the identifier selector 620 can use another class identifier 520 corresponding to the set of classes identified by the model applier 530. In some implementations, the obfuscation policy can specify that no class identifier 620 is to be included under such conditions. Accordingly, the identifier selector 620 can prevent, remove, or otherwise restrict any class identifier 620 from inclusion into the request for content 625.

With the selection of the class identifier 520, the resource processor 615 can include the class identifier 520 selected for the application 435 into the request for content 625. In some implementations, the resource processor 615 can access the identifier cache 545 to retrieve the class identifier 520. Once retrieved, the resource processor 615 can include the class identifier 520 to include the request for content 625. In some implementations, the request for content 625 initially generated by the application 435 in parsing the script for the content slot 610 and can originally include the unique tracking identifier. The resource processor 615 can remove or otherwise exclude any unique tracking identifiers corresponding to the application 435 (or the client device 430 running the application 435 or the account associated with the application 435) from the request for content 625. The unique tracking identifiers can include, for example, a cookie a user identifier corresponding to the account associated with the application 435 or a cookie device identifier corresponding to the client device 430 running the application 435. The unique tracking identifier may have been provided by the content provider 415 or another content placement service. Once removed, the resource processor 615 can include the class identifier 520 into the request for content 625. In some implementations, the resource processor 615 can replace the unique tracking identifier included in the request for content 625 with the class identifier 520. In some implementations, the resource processor 615 can remove any identifiers including the tracking identifier or any of the class identifiers 520 responsive to the determination in accordance with the obfuscation policy.

In some implementations, the resource processor 615 can package or include the class identifier 520 into a specified portion of the request for content 620. In some implementations, the resource processor 615 can include the class identifier 520 into at least one header field of the request for content 625. In some implementations, the resource processor 615 can include the class identifier 520 into a body of the request for content 625. In some implementations, the resource processor 615 can include the class identifier 520 into a cookie. In some implementations, the cookie can be generated in conjunction with the request for content 625. In some implementations, the cookie can be retrieved from the application 435 (e.g., the identifier cache 545). The cookie can have a secure flag or an HTTP-only flag set to prevent unauthorized entities interception and access to the class identifier 520. The unauthorized entities can include those besides the content selection service 425 or the application manager service 410. By setting the secure flag or the HTTP-only flag, the cookie can also limit accessing the class identifier 520 over secure communication channels (e.g., Hypertext Transfer Protocol Secure (HTTPS)) through the network 405. The resource processor 615 can include the cookie including the class identifier 520 into the request for content 625. The cookie can also include the address corresponding to the content publisher 420 that provided the application 435 with the information resource 600. Upon generation, the resource processor 615 can transmit the request for content 625 to the content selection service 425 via the network 405. In some implementations, the application 435 can establish a secure communication channel (e.g., in accordance with HTTP) between the client device 430 and the content selection service 425 to transmit the request for content 625. The establishment of the channel can permit the content selection service 425 access to the class identifier 520 included in the cookie of the request for content 625.

The class identifiers 520A-N assigned by the respective model appliers 530 to different applications 435A-N running on the client devices 430A-N may not be particular to one application 435A-N and may not uniquely identify the application 435A-N. For example, as depicted, the first class identifier 520A may have been assigned to the first application 435A on the first client device 430A and also the second application 435B running on the second client device 430B. In contrast, the second class identifier 520B may have been assigned to the n-th application 435N running on the n-th client device 430N. This may be in contrast to unique tracking identifiers such as user or client identifiers specifically identifying the applications 435A-N or the client devices 430A-N provided by the content provider 415 or other content placement services. In addition, since the class identifiers 520A-N may not uniquely identify each application 435 running on the client device 430, the class identifiers 520A-N can have a lower entropy than such unique tracking identifiers. For example, the entropy of unique tracking identifiers can have an entropy of greater than 63 bits, whereas the entropy of class identifiers 520A-N can have an entropy of between 18 to 52 bits. As such, the class identifiers 520A-N can be of smaller in size than these unique tracking identifiers, thereby lessening the size of the request for content 625 sent over the network 405.

Figure 7:
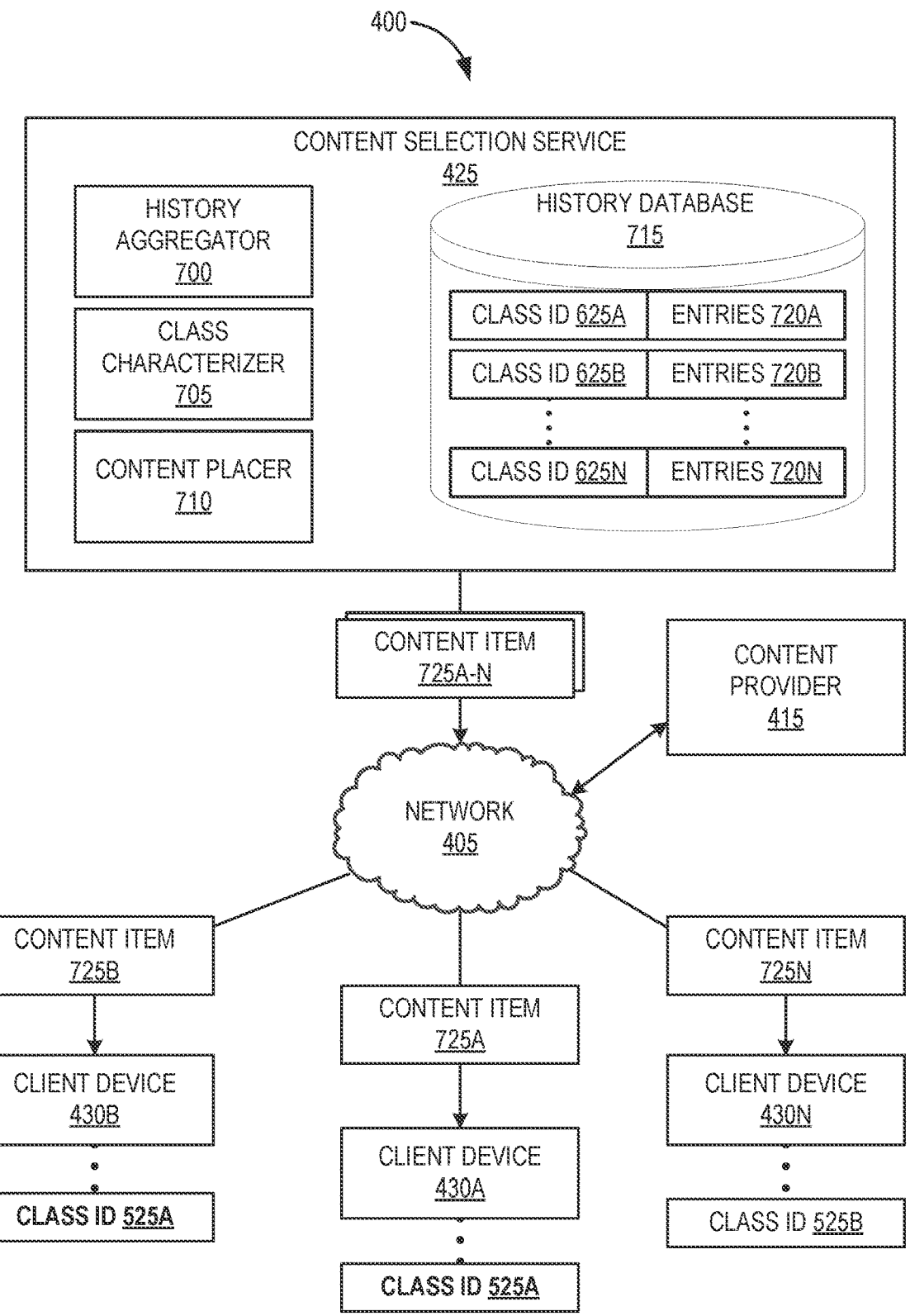
FIG. 7 is a block diagram depicting a client device and a content selection service in a system for encoding identifiers for selection of content using classification models, according to an illustrative implementation.

Referring now to FIG. 7, depicted is a block diagram depicting one implementation of the client devices 430 and the content selection service 425 in the system 400. The content selection service 425 can include at least one history aggregator 700 to store and maintain browsing history. The content selection service 425 can include at least one class characterizer 705 to determine a selection parameter for each class. The content selection service 425 can include at least one content placer 710 to identify a content item 725A-N (hereinafter referred to as content item 725 generally) for the application 435 associated with the request 620 using the identified class. The content selection service 425 can include at least one history database 715 to maintain and store browsing history entries 720A-N (referred herein as an entry 720 generally) for a class identifier 520.

In further detail, the history aggregator 700 executing on the content selection service 425 can collect, aggregate, or otherwise maintain the history database 715 using the cookies 630 included in the requests for content 620 received from client devices 430. The history database 715 can include a set of entries 720 indexed by class identifiers 520 defined by the application manager service 410. Each entry 720 can include the address for the accessed information resource 600 and the timestamp indicating a time that the information resource 600 was accessed. Instead of aggregating browsing histories of the client devices 430 using unique tracking identifiers (e.g., cookie identifiers), the history aggregator 700 can aggregate browsing history by class identifiers 520. Unlike the browsing histories 530 maintained on each individual application 435, the history database 715 may not individually identify the application 435 (or user associated with the application 435) from which the entries 720 were generated. Each time a request for content 625 is received, the history aggregator 700 can identify the address corresponding to the information resource 600 on which content is to be returned. The history aggregator 700 can further identify the class identifier 520 included in the request for content 625. With these identifications, the history aggregator 700 can add an entry 720 including the address and the time stamp (not shown in FIG. 4) to the set of entries 720 for the class identifier 520 included in the request for content 625.

The class characterizer 705 executing on the content selection service 425 can determine one or more characteristics for each class based on the entries 720 for the class identifier 520 for the class. The characteristics can include, for example, a common trait, profile, behavior, or interest for the class corresponding to the class identifier 520. In some implementations, the class characterizer 705 can use a class profile model to determine the characteristic for the class based on the set of entries 720 in the history database 715 for the class identifier 520. The class profile model can be any model, such as a linear regression, a logistic regression, artificial neural network (ANN), a support vector machine (SVM), and Naïve Bayes classifier, among others. The class profile model may have been trained using sample dataset correlating browsing histories labeled by the class identifiers 520 with certain characteristics. The class profile model can convert the entries 720 on the history database 715 for each class identifier 520 to the characteristics for the corresponding class. In some implementations, the class characterizer 705 can store and maintain the characteristics for each class identifier 520. The content placer 710 executing on the content selection service 425 can select or identify a content item 725 from a set of content items 725 in response to the request for content 625 using the class identifier 520. The use of the class identifier 520 may be in contrast to using a unique identifier for a particular user associated with the request for content, in that the selection of the content item 725 may not be based on an identifier unique to a particular user. Each content item 725 can include an object or element to embed, insert, or otherwise add to the content slot 610 of the information resource 600. Each content item 725 can be provided by one or more of the content providers 415. Upon receipt, the content placer 710 can parse the request for content 625 to identify the class identifier 520. Upon identification, the content placer 710 can identify the characteristics for the class corresponding to the class identifier 520. The content placer 710 can identify or select the content item 725 associated with the characteristics for the class. In some implementations, the content placer 710 can use a content placement process to select the content item 725. The content placement process can use a model such as a linear regression, a logistic regression, artificial neural network (ANN), a support vector machine (SVM), and Naïve Bayes classifier, among others. For each content item 725, the content placement process can calculate, determine, or generate a predicted likelihood of interaction by users in the class corresponding to the class identifier 520 included in the request for content 625. The content placer 710 can identify the content item 725 with the greatest likelihood of interaction by users in the class. Once selected, the content placer 710 can transmit the content item 725 to the client device 430 that originated the request for content 625. In some implementations, the content placer 710 can send an address for the content item 725 to the client device 430 for the application 435 to retrieve the selected content item 725 from the content provider 415.

Referring back to FIG. 6 in conjunction with FIG. 7, the resource processor 615 can receive the content item 725 identified by the content selection service 425. The resource processor 615 can embed, insert, or add the content item 725 into the content slot 610 of the information resource 600. In some implementations, the resource processor 615 can receive the address for the content item 725. The address for the content item 725 can reference the content provider 415. The resource processor 615 can send another request to the content provider 415 to retrieve the content item 725, and insert the content item 725 into the content slot 610 of the information resource 600.

In this manner, the content selection service 425 can select content items 725 with the expectation that users associated with the same class identifiers 520 are expected to have a similar response. Furthermore, data security, integrity, and privacy over the browsing histories 530 of individual users can be preserved. At the same time, with the ability to determine relevancy in the selection of content items 725 to individual classes, the quality of human-computer interactions (HCI) with the overall information resource 600 can be maintained.

Figure 8:
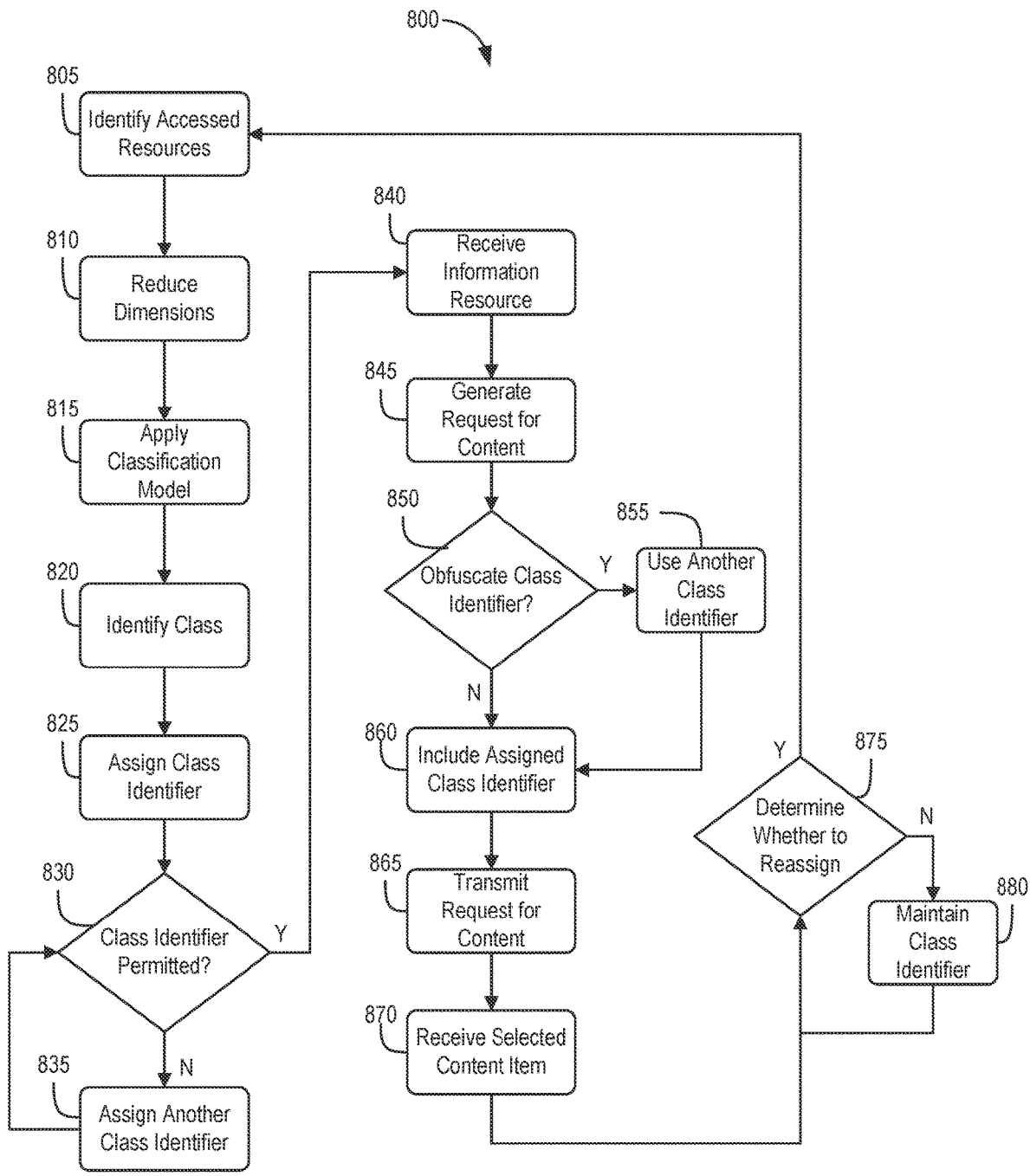
FIG. 8 is a flow diagram depicting a method of encoding identifiers for selection of content using classification models, according to an illustrative implementation.
Figure 9:
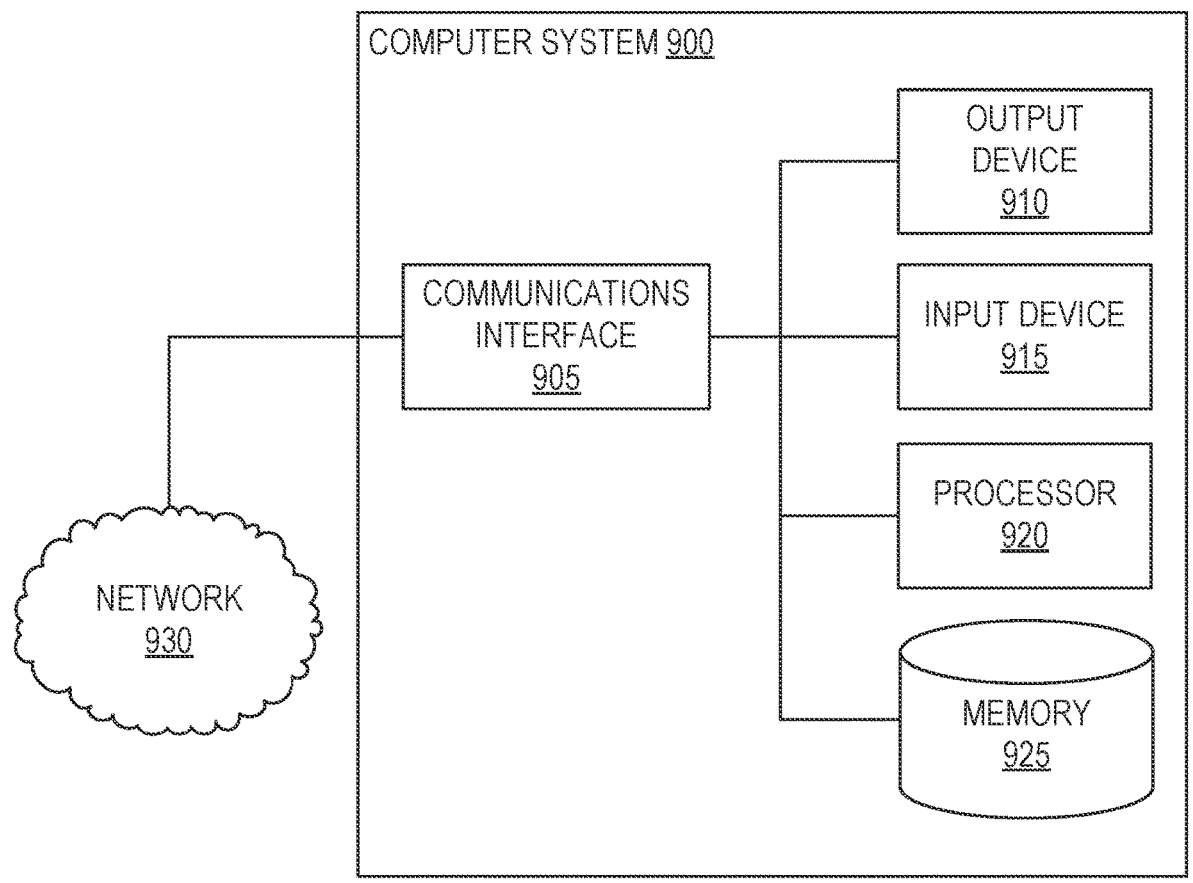
FIG. 9 is a block diagram illustrating a general architecture for a computer system that may be employed to implement elements of the systems and methods described and illustrated herein, according to an illustrative implementation.

Referring now to FIG. 8, depicted is a flow diagram depicting on implementation of a method 800 of encoding identifiers for selection of content using classification models. The functionality described herein with respect to method 800 can be performed or otherwise executed by the system 400 as shown on FIG. 4 or a computing device as shown in FIG. 9. In brief overview, an application running on a client device can identify accessed information resources (805). The application can reduce dimensions (810). The application can apply a classification model (815). The application can identify a class (820). The application can assign a class identifier (825). The application can determine whether the class identifier is permitted (830). If not, the application can assign another class identifier (835). The application can receive an information resource (840). The application can generate a request for content (845). The application can determine whether to obfuscate the class identifier (850). If so, the application can use another class identifier (855). The application can include the class identifier (860). The application can transmit the request for content (865). The application can receive a selected content item (870). The application can determine whether to reassign (875). If not, the application can maintain the class identifier (880).

In further detail, the application (e.g., the application 435) on a client device (e.g., the client device 430) can identify accessed information resources (805). In some implementations, the application can identify the accessed information resources from a browsing history (e.g., the browsing history 530). The browsing history can include a set of entries (e.g., the entries 540). Each entry can include an address for an accessed information resource and, in some implementations, a timestamp identifying a time at which the information resource was accessed. For each accessed information resource, the application can extract features from the content on the information resource. The application can generate a set of feature vectors from the set of entries of the browsing history. The feature vectors can be a projection of the browsing history into a set of dimensions. The dimensions can include time ranges and address attributes, among others. The application can reduce dimensions (810). Using a dimension reduction process, the application can generate a set of reduced feature vectors from the initial set of feature vectors. In some implementations, the step (810) may be performed across the application 435 and another server. In some implementations, the step (810) may be omitted. In some implementations, the step (810) may be replaced with or combined with training of a classification model. For example, the classification model may be trained using a distributed learning protocol such as federated learning using an optimization algorithm (e.g., a stochastic gradient descent (SGD) or averaging). During each iteration, each application can set or adjust values of the classification model using the training dataset and can provide the values to one another in accordance with the distributed learning protocol.

The application can apply a classification model (e.g., the classification model 500) to the features extracted from the accessed information resources (815). The classification model can include a set of inputs, a set of parameters, and a set of outputs. The classification model may be, for example, a classification algorithm, a clustering model, or a locality-sensitive hash function, among others. The set of inputs can include the features extracted from accessed information resources, entries of browsing history, or representations of the browsing history. The set of parameters can relate the inputs to the outputs. The set of outputs can include a class to which to categorize the user who interacts with the application based on the browsing history by the user on the application. The application can feed the set of reduced-dimension feature vectors as the input of the classification model. The classification model can apply the parameters to the input. The application can identify a class (820). With the application of the classification model, the classification model can generate the output identifying one or more classes to which to categorize the user who interacts with the application. The classification of the application can by extension correspond to or include classification of a user associated with the account operating the application or the client device operated by the user. The application can assign a class identifier (e.g., the class identifier 520) (825). The classification model can associate each class to one of the class identifiers. Once the class identifier is identified, the application can identify the class identifier corresponding to the class and assign the application to the class identifier.

The application can determine whether the class identifier is permitted (830). The determination can be in concert or in coordination with an authentication service (e.g., the class authorizer 550 on the application manager service 410) in accordance with a threshold cryptography scheme. The application may send an encrypted copy of the class identifier corresponding to the class. Under the threshold cryptography scheme, the authentication service may be unable to decrypt the class identifier unless the number of requests with the encrypted copy of the same identifier exceeds the threshold number. The inability to decrypt may be, for example, because the authentication service may not have received enough portions of a decryption key (e.g., private keys) from the requests. Once enough portions are received, the authentication service may be able to successfully decrypt the encrypted copy. The authentication service can return the output of the decryption attempt. The application can compare the output with the original class identifier. When matching, the application can determine that the class is permitted. Otherwise, the application can determine that the class is not permitted. If the class identifier is not permitted, the application can assign another class identifier (835). The application can find another class identifier from the identified set of classes, and can repeat the functionality in (830).

The application can receive an information resource (e.g., the information resource 600) (840). The information resource can include primary content (e.g., the primary content 605) and a content slot (e.g., the content slot 610). The primary content can be provided by a content publisher (e.g., the content publisher 420). The content slot can be available for insertion of content from a content provider (e.g., the content provider 415) or a content selection service (e.g., the content selection service 425). Upon receipt, the application can parse the information resource. The application can generate a request for content (e.g., the request for content 625) (845). The generation of the request for content can be in conjunction with the parsing of the information resource.

The application can determine whether to obfuscate the class identifier (850). The determination may be in accordance with an obfuscation policy. The obfuscation policy can specify one or more conditions under which the class identifier is restricted for inclusion in requests for content. For example, the conditions can include a security protocol (e.g., HTTPS) in accordance to which the information resource is received. The obfuscation policy in this example may specify that no class identifier is to be included in requests for content when the information resource is not encrypted under HTTPS. The application can identify the conditions related to the information resource to compare against the conditions specified by the obfuscation policy. When the conditions do not match, the application can determine that the class identifier is not to be obfuscated and maintain the current class identifier. Otherwise, when the conditions do match, the application can determine that the class identifier is to be obfuscated. If the class identifier is determined to be obfuscated, the application can use another class identifier (855).

The application can include the class identifier in the request for content (860). The request for content can include the class identifier corresponding to the class identified using the classification model. The application can also remove any unique tracking identifier associated with a user of the application, the application itself, or the client device running on the application. The unique tracking identifier may have been provided as part of a third-party cookie from the content provider or another content placement platform. The class identifier can be included as part of a secure cookie included in the request for content. The application can transmit the request for content (865) to a content selection service or other content provider. The transmission may be over a secure communication channel established between the client device and the content selection service. The request for content can be received by the content selection service. The content selection service can use the class identifier included in the request to identify a content item from a set of content items (e.g., the content items 725). With the selection, the content selection service can send the content item to the application. The application can receive the selected content item (870). The application can insert the content item to the content slot defined on the information resource.

The application can determine whether to reassign class identifier (875). The reassignment may be in accordance with an identifier assignment policy. The policy can specify a set of conditions under which the classification model is to be applied again to the browsing history to find a new class identifier. For example, the reassignment policy may specify that the classification model is to be reapplied when an amount of additional entries in the browsing history since the previous assignment is over a threshold amount. If the determination is to reassign, the application can repeat the functions of (805)-(835) and onward. On the other hand, if the determination is not to reassign, the application can maintain the class identifier (880).

Accordingly, the systems and methods described herein allow for the selection of content items relevant to users without individually tracking user activity. In this manner, data security, integrity, and privacy over the browsing histories of individual users can be preserved. At the same time, with the ability to determine relevancy in the selection of content items to individual classes, the quality of human-computer interactions (HCI) with the overall information resource can be maintained.

FIG. 9 shows the general architecture of an illustrative computer system 900 that may be employed to implement any of the computer systems discussed herein (including the application manager service 410 and its components, the content provider 415 and its components, the content publisher 420 and its components, the content selection service 425 and its components, and the client device 430 and its components) in accordance with some implementations. The computer system 900 can be used to provide information via the network 930 for display. The computer system 900 comprises one or more processors 920 communicatively coupled to memory 925, one or more communications interfaces 905 communicatively coupled with at least one network 930 (e.g., the network 405), and one or more output devices 910 (e.g., one or more display units) and one or more input devices 915.

The processor 920 can include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory 925 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). The memory 925 can include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The processor(s) 920 shown in FIG. 9 may be used to execute instructions stored in the memory 925 and, in so doing, also may read from or write to the memory various information processed and or generated pursuant to execution of the instructions. The processors 920 coupled with memory 925 (collectively referred herein as a processing unit) can be included in the application manager service 410. For example, the application manager service 410 can include the memory 925 as the database 515. The processors 920 coupled with memory 925 (collectively referred herein as a processing unit) can be included in the content provider 415. For example, the content provider 415 can include the memory 925 to store the content items 725. The processors 920 coupled with memory 925 (collectively referred herein as a processing unit) can be included in the content publisher 420. For example, the content publisher 420 can include the memory 925 to store the information resource 600. The processors 920 coupled with memory 925 (collectively referred herein as a processing unit) can be included in the content selection service 425. For example, the content selection service 425 can include the memory 925 as the history database 720. The processors 920 coupled with memory 925 (collectively referred herein as a processing unit) can be included in the client device 430. For example, the client device 430 can include the memory 925 as the browsing history 535 and identifier cache 545.

The processor 920 of the computer system 900 also may be communicatively coupled to or made to control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). While not shown explicitly in the system of FIGS. 4-7 or 9, one or more communications interfaces facilitate information flow between the components of the system 900. In some implementations, the communications interface(s) may be configured (e.g., via various hardware components or software components) to provide a website as an access portal to at least some aspects of the computer system 900. Examples of communications interfaces 905 include user interfaces (e.g., the application 435, the information resource 600, the primary content 605, the content slot 610, and the content item 725), through which the user can communicate with other devices of the system 400.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

The network 930 can include computer networks such as the internet, local, wide, metro or other area networks, intranets, satellite networks, other computer networks such as voice or data mobile phone communication networks, and combinations thereof. The network 930 may be any form of computer network that relays information among the components of the system 400, such as the application manager service 410, the content provider 415, the content publisher 420, the content selection service 425, and the client devices 430. For example, the network 930 may include the Internet and/or other types of data networks, such as a local area network (LAN), a wide area network (WAN), a cellular network, satellite network, or other types of data networks. The network 930 may also include any number of computing devices (e.g., computer, servers, routers, network switches, etc.) that are configured to receive and/or transmit data within network 930. The network 930 may further include any number of hardwired and/or wireless connections. The client device 430 may communicate wirelessly (e.g., via WiFi, cellular, radio, etc.) with a transceiver that is hardwired (e.g., via a fiber optic cable, a CAT5 cable, etc.) to other computing devices in network 930.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable a receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, or other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In some implementations, the features may be implemented on a laptop computer or other personal computer, a smartphone, other mobile phone, handheld computer, a tablet PC, or other computing device. In some implementations, the features disclosed herein may be implemented on a wearable device or component (e.g., smart watch) which may include a processing module configured to integrate internet connectivity (e.g., with another computing device or the network 930).

The operations described in this specification can be implemented as operations performed by a data processing apparatus on data stored on one or more computer-readable storage devices or on data received from other sources.

The terms "data processing apparatus", "data processing system", "user device" or "computing device" encompasses all kinds of apparatuses, devices, and machines for processing data, including by way of example a programmable processor, a computer, a system on a chip or multiple chips, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from read-only memory or random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well. For example, feedback provided to the user can include any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 900 or system 400 can include clients and servers. For example, the application manager service 410, the content provider 415, the content publisher 420, and the content selection service 425 of the system 400 can each include one or more servers in one or more data centers or server farms. A client (e.g., the client device 430) and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Communication networks may include a local area network ("LAN") and a wide area network ("WAN"), an inter-network (e.g., the Internet), and peer-to-peer networks (e.g., ad hoc peer-to-peer networks).

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

What is claimed:
1. A method for anonymization to provide pseudo-personalized clustering, comprising:
    aggregating, by one or more computing devices, a vector received from a client device into a matrix with vectors obtained from other client devices;
    calculating, by the one or more computing devices, a dimension reduction of the matrix to obtain a dimen- sion reduced matrix representing the aggregated vectors obtained from the client device and the other client devices;
determining, by the one or more computing devices, clusters of the dimension reduced matrix;
adjusting, by the one or more computing devices, a classifier model based on the identified clusters and singular vectors of the dimension reduced matrix;
transmitting, by the one or more computing devices and to the client device, at least some of the singular vectors and weights of the classifier model;
receiving, by the one or more computing devices and from the client device, a request for content including a cluster identifier generated by the client device using the at least some of the singular vectors, the weights of the classifier model, and features of resources accessed through a first application executing at the client device; and
transmitting, to the client device and responsive to the request, content selected using parameters of one of the clusters corresponding to the cluster identifier received in the request.

2. The method of claim 1, further comprising:
determining, by the one or more computing devices, the parameters of each particular cluster among the clusters based on the weights of the classifier model and the singular vectors of the dimension reduced matrix.

3. The method of claim 2, wherein determining the parameters of each particular cluster comprises:
for each particular cluster:
calculating a profile vector representing aggregate browsing history of client devices represented by the particular cluster; and
inferring the parameters of the cluster based on keywords or topics corresponding to the aggregate browsing history.

4. The method of claim 1, further comprising:
identifying, by the client device, a plurality of resources accessed through the first application executing on the client device; and
extracting, by the client device and from each resource of the plurality of resources, one or more features corresponding to at least a portion of content provided by the resource.

5. The method of claim 4, further comprising:
generating, by the client device, the cluster identifier using the at least some of the singular vectors, the weights of the classifier model, and the one or more features extracted from each resource of the plurality of resources;
generating, by the client device, the request for content including the cluster identifier; and
transmitting, by the client device and to the one or more computing devices, the request including the cluster identifier.

6. The method of claim 5, further comprising:
determining, by the client device, that at least a threshold number of applications are assigned the cluster identifier, wherein inclusion of the cluster identifier in the request is conditioned on at least the threshold number of applications being assigned the cluster identifier.

7. The method of claim 6, wherein determining that at least the threshold number of applications are assigned the cluster identifier comprises performing a threshold cryptographic protocol in concert with an authorization service using an encrypted identifier generated using the cluster identifier.

8. A system, comprising:
one or more computing devices; and
one or more memory devices coupled with the one or more computing devices, wherein instructions executed by the one or more computing devices cause the one or more computing device to perform operations comprising:
aggregating a vector received from a client device into a matrix with vectors obtained from other client devices;
calculating a dimension reduction of the matrix to obtain a dimension reduced matrix representing the aggregated vectors obtained from the client device and the other client devices;
determining clusters of the dimension reduced matrix;
adjusting a classifier model based on the identified clusters and singular vectors of the dimension reduced matrix;
transmitting, to the client device, at least some of the singular vectors and weights of the classifier model;
receiving, from the client device, a request for content including a cluster identifier generated by the client device using the at least some of the singular vectors, the weights of the classifier model, and features of resources accessed through a first application executing at the client device; and
transmitting, to the client device and responsive to the request, content selected using parameters of one of the clusters corresponding to the cluster identifier received in the request.

9. The system of claim 8, wherein the instructions cause the one or more computing devices to perform operations further comprising:
determining the parameters of each particular cluster among the clusters based on the weights of the classifier model and the singular vectors of the dimension reduced matrix.

10. The system of claim 9, wherein determining the parameters of each particular cluster comprises:
for each particular cluster:
calculating a profile vector representing aggregate browsing history of client devices represented by the particular cluster; and
inferring the parameters of the cluster based on keywords or topics corresponding to the aggregate browsing history.

11. The system of claim 8, further comprising:
a client device configured to execute instructions that cause the client device to perform operations comprising:
identifying a plurality of resources accessed through the first application executing on the client device; and
extracting, from each resource of the plurality of resources, one or more features corresponding to at least a portion of content provided by the resource.

12. The system of claim 11, wherein the instructions cause the client device to perform operations further comprising:
generating the cluster identifier using the at least some of the singular vectors, the weights of the classifier model, and the one or more features extracted from each resource of the plurality of resources;
generating the request for content including the cluster identifier; and
transmitting, to the one or more computing devices, the request including the cluster identifier.

13. The system of claim 12, wherein the instructions cause the client device to perform operations further comprising:
  determining that at least a threshold number of applications are assigned the cluster identifier, wherein inclusion of the cluster identifier in the request is conditioned on at least the threshold number of applications being assigned the cluster identifier.

14. The system of claim 13, wherein determining that at least the threshold number of applications are assigned the cluster identifier comprises performing a threshold cryptographic protocol in concert with an authorization service using an encrypted identifier generated using the cluster identifier.

15. One or more non-transitory computer readable medium storing instructions that, when executed by one or more data processing apparatus, cause the one or more data processing apparatus to perform operations comprising:
  aggregating a vector received from a client device into a matrix with vectors obtained from other client devices;
  calculating a dimension reduction of the matrix to obtain a dimension reduced matrix representing the aggregated vectors obtained from the client device and the other client devices;
  determining clusters of the dimension reduced matrix;
  adjusting a classifier model based on the identified clusters and singular vectors of the dimension reduced matrix;
  transmitting, to the client device, at least some of the singular vectors and weights of the classifier model;
  receiving, from the client device, a request for content including a cluster identifier generated by the client device using the at least some of the singular vectors, the weights of the classifier model, and features of resources accessed through a first application executing at the client device; and
  transmitting, to the client device and responsive to the request, content selected using parameters of one of the clusters corresponding to the cluster identifier received in the request.

16. The one or more non-transitory computer readable medium of claim 15, wherein the instructions cause the one or more data processing apparatus to perform operations further comprising:
  determining the parameters of each particular cluster among the clusters based on the weights of the classifier model and the singular vectors of the dimension reduced matrix.

17. The one or more non-transitory computer readable medium of claim 16, wherein determining the parameters of each particular cluster comprises:
  for each particular cluster:
    calculating a profile vector representing aggregate browsing history of client devices represented by the particular cluster; and
    inferring the parameters of the cluster based on keywords or topics corresponding to the aggregate browsing history.

18. The one or more non-transitory computer readable medium of claim 15, wherein the instructions cause the client device to perform operations comprising:
  identifying a plurality of resources accessed through the first application executing on the client device; and
  extracting, from each resource of the plurality of resources, one or more features corresponding to at least a portion of content provided by the resource.

19. The one or more non-transitory computer readable medium of claim 18, wherein the instructions cause the client device to perform operations further comprising:
  generating the cluster identifier using the at least some of the singular vectors, the weights of the classifier model, and the one or more features extracted from each resource of the plurality of resources;
  generating the request for content including the cluster identifier; and
  transmitting, to the one or more data processing apparatus, the request including the cluster identifier.

20. The one or more non-transitory computer readable medium of claim 19, wherein the instructions cause the client device to perform operations further comprising:
  determining that at least a threshold number of applications are assigned the cluster identifier, wherein inclusion of the cluster identifier in the request is conditioned on at least the threshold number of applications being assigned the cluster identifier.

* * * * *